US007396593B2

(12) United States Patent
Liu et al.

(10) Patent No.: US 7,396,593 B2
(45) Date of Patent: Jul. 8, 2008

(54) SINGLE PLY TISSUE PRODUCTS SURFACE TREATED WITH A SOFTENING AGENT

(75) Inventors: Kou-Chang Liu, Appleton, WI (US); Tom G. Shannon, Neenah, WI (US); Peter J. Allen, Neenah, WI (US); Geof Carlow, Neenah, WI (US); Mike Goulet, Neenah, WI (US); Paul Burden, Barrow in Furness (GB); Greg Aykens, Menasha, WI (US); Joe Capizzi, Neenah, WI (US); Thomas Hunt, Appleton, WI (US); Diane Linskens, Seymour, WI (US); Roger Wendler, Sherwood, WI (US); John Wnek, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 349 days.

(21) Appl. No.: 10/441,143

(22) Filed: May 19, 2003

(65) Prior Publication Data

US 2004/0234804 A1 Nov. 25, 2004

(51) Int. Cl.
*B32B 5/66* (2006.01)

(52) U.S. Cl. ........................ 428/532; 428/533; 428/534; 428/536; 428/537.5

(58) Field of Classification Search ................. 428/532, 428/533, 534, 536, 537.5
See application file for complete search history.

(56) References Cited

U.S. PATENT DOCUMENTS

| | | | |
|---|---|---|---|
| 2,345,543 | A | 3/1944 | Wohnsiedler et al. |
| 2,926,116 | A | 2/1960 | Keim |
| 2,926,154 | A | 2/1960 | Keim |
| 3,556,932 | A | 1/1971 | Coscia et al. |
| 3,556,933 | A | 1/1971 | Williams et al. |
| 3,700,623 | A | 10/1972 | Keim |
| 3,722,469 | A | 3/1973 | Bartley et al. |
| 3,772,076 | A | 11/1973 | Keim |
| 3,849,241 | A | 11/1974 | Butin et al. |
| 3,865,078 | A | 2/1975 | De Howitt et al. |
| 3,885,158 | A | 5/1975 | Flutie et al. |
| 3,899,388 | A | 8/1975 | Petrovich et al. |
| 3,905,329 | A | 9/1975 | Cone et al. |
| 3,930,465 | A | 1/1976 | Schuierer |
| 3,965,518 | A | 6/1976 | Muoio |
| 4,005,028 | A | 1/1977 | Heckert |
| 4,005,030 | A | 1/1977 | Heckert et al. |
| 4,016,831 | A | 4/1977 | James et al. |
| 4,023,526 | A | 5/1977 | Ashmus et al. |
| 4,061,001 | A | 12/1977 | von der Eltz et al. |
| 4,081,318 | A | 3/1978 | Wietsma |
| 4,089,296 | A | 5/1978 | Barchi |
| 4,099,913 | A | 7/1978 | Walter et al. |
| 4,112,167 | A | 9/1978 | Dake et al. |
| 4,118,526 | A | 10/1978 | Gregorian et al. |
| 4,129,528 | A | 12/1978 | Petrovich et al. |
| 4,147,586 | A | 4/1979 | Petrovich et al. |
| 4,158,076 | A | 6/1979 | Wallsten |
| 4,159,355 | A | 6/1979 | Kaufman |
| 4,184,914 | A | 1/1980 | Jenkins |
| 4,193,762 | A | 3/1980 | Namboodri |
| 4,198,316 | A | 4/1980 | Nahta |
| 4,222,921 | A | 9/1980 | Van Eenam |
| 4,230,746 | A | 10/1980 | Nahta |
| 4,237,818 | A | 12/1980 | Clifford et al. |
| 4,263,344 | A | 4/1981 | Radvan et al. |
| 4,276,339 | A | 6/1981 | Stoveken |
| 4,279,964 | A | 7/1981 | Heller |
| 4,288,475 | A | 9/1981 | Meeker |

(Continued)

FOREIGN PATENT DOCUMENTS

| | | |
|---|---|---|
| DE | 252208 | 10/1912 |

(Continued)

OTHER PUBLICATIONS

Article—*New technology to apply starch and other additives*, M. Foulger, J. Parisian, H. P. Didwania, and J. Taylor, Pulp & Paper Canada, vol. 100. No. 2, 1999, pp. 24-25.

(Continued)

*Primary Examiner*—Leszek Kiliman
(74) *Attorney, Agent, or Firm*—Dority & Manning, P.A.

(57) ABSTRACT

Tissue products are described that have been topically treated with a chemical additive, such as a softener. The softener may be, for instance, a polysiloxane. The polysiloxane is topically applied to a tissue sheet, such as a single ply sheet, so as to form a Z-directional gradient in the sheet. Particular, most of the polysiloxane remains on the surface of the tissue product as opposed to migrating to the center of the sheet. In this manner, tissue sheets are formed with improved softness at lower levels of polysiloxane and without the need for applying any surfactants to the sheet. A system for applying chemical additives to tissue sheets is also described. The system includes a chemical additive applicator, such as a meltblown die that emits the chemical additive through a plurality of orifices. In one embodiment, the system includes a device for periodically cleaning the orifices during application of the chemical additive. The cleaning device may be, for instance, a brush that traverses across the die head when desired.

46 Claims, 15 Drawing Sheets

U.S. PATENT DOCUMENTS 4,297,860 A 11/1981 Pacifici et al.
4,305,169 A 12/1981 Vidalis
4,343,835 A 8/1982 Jones et al.
4,348,251 A 9/1982 Pauls et al.
4,364,784 A 12/1982 Van Wersch et al.
4,366,682 A 1/1983 Keller
4,384,867 A 5/1983 Grüber
4,385,954 A 5/1983 Pauls et al.
4,387,118 A 6/1983 Shelton
4,400,953 A 8/1983 Driessen et al.
4,402,200 A 9/1983 Clifford et al.
4,408,996 A 10/1983 Baldwin
4,426,418 A 1/1984 Coleman et al.
4,435,965 A 3/1984 Sasseville et al.
4,440,808 A 4/1984 Mitter
4,442,771 A 4/1984 Mitter
4,444,104 A 4/1984 Mitter
4,453,462 A 6/1984 Mitter
4,463,467 A 8/1984 Grüber et al.
4,463,583 A 8/1984 Krüger et al.
4,474,110 A 10/1984 Rosner
4,481,243 A 11/1984 Allen
4,497,273 A 2/1985 Mitter
4,498,318 A 2/1985 Mitter
4,501,038 A 2/1985 Otting
4,502,304 A 3/1985 Hopkins
4,529,480 A 7/1985 Trokhan
4,534,189 A 8/1985 Clifford
4,551,199 A 11/1985 Weldon
4,552,778 A 11/1985 Zimmer
4,557,218 A 12/1985 Sievers
4,559,243 A 12/1985 Pässler et al.
4,562,097 A 12/1985 Walter et al.
4,571,360 A 2/1986 Brown et al.
4,576,112 A 3/1986 Funger et al.
4,581,254 A 4/1986 Cunningham et al.
4,597,831 A 7/1986 Anderson
4,603,176 A 7/1986 Bjorkquist et al.
4,605,702 A 8/1986 Guerro et al.
4,612,874 A 9/1986 Mitter
4,618,689 A 10/1986 Traver et al.
4,646,675 A 3/1987 Arthur et al.
4,655,056 A 4/1987 Zeiffer
4,665,723 A 5/1987 Zimmer
4,667,882 A 5/1987 Pacifici
4,699,988 A 10/1987 Traver et al.
4,731,092 A 3/1988 Berendt
4,734,100 A 3/1988 Berendt et al.
4,741,739 A 5/1988 Berendt et al.
4,762,727 A 8/1988 Voswinckel
4,773,110 A 9/1988 Hopkins
4,778,477 A 10/1988 Lauchenauer
4,792,619 A 12/1988 Berendt et al.
4,799,278 A 1/1989 Beeh
4,833,748 A 5/1989 Zimmer et al.
4,872,325 A 10/1989 Moser et al.
4,894,118 A 1/1990 Edwards et al.
4,911,956 A 3/1990 Gabryszewski et al.
4,912,948 A 4/1990 Brown et al.
4,943,350 A 7/1990 Bogart et al.
4,950,545 A 8/1990 Walter et al.
5,008,131 A 4/1991 Bakhshi
5,009,932 A 4/1991 Klett et al.
5,048,589 A 9/1991 Cook et al.
5,059,282 A 10/1991 Ampulski
5,085,920 A 2/1992 Nohr et al.
5,089,296 A 2/1992 Bafford et al.
5,098,979 A 3/1992 O'Lenick, Jr.
5,145,527 A 9/1992 Clifford et al.
5,164,046 A 11/1992 Ampulski et al.
5,165,261 A 11/1992 Cho
5,215,626 A 6/1993 Ampulski et al.
5,219,620 A 6/1993 Potter et al.
5,227,023 A 7/1993 Pounder et al.
5,227,242 A 7/1993 Walter et al.
5,237,035 A 8/1993 O'Lenick, Jr. et al.
5,245,545 A 9/1993 Taylor
5,246,545 A 9/1993 Ampulski et al.
5,246,546 A 9/1993 Ampulski
5,328,565 A 7/1994 Rasch et al.
5,328,685 A 7/1994 Janchitraponvej et al.
5,340,609 A 8/1994 Arthur et al.
5,366,161 A 11/1994 Potter et al.
5,385,643 A 1/1995 Ampulski
5,389,204 A 2/1995 Ampulski
5,399,412 A 3/1995 Sudall et al.
5,466,337 A 11/1995 Darlington et al.
5,479,947 A 1/1996 Dyett
5,492,655 A 2/1996 Morton et al.
5,505,997 A 4/1996 Strong et al.
5,510,001 A 4/1996 Hermans et al.
5,525,345 A 6/1996 Warner et al.
5,529,665 A 6/1996 Kaun
5,538,595 A 7/1996 Trokhan et al.
5,552,020 A 9/1996 Smith et al.
5,558,873 A 9/1996 Funk et al.
5,573,637 A 11/1996 Ampulski et al.
5,591,306 A 1/1997 Kaun
5,591,309 A 1/1997 Rugowski et al.
5,601,871 A 2/1997 Krzysik et al.
5,605,719 A 2/1997 Tench et al.
5,607,980 A 3/1997 McAtee et al.
5,614,293 A 3/1997 Krzysik et al.
5,623,043 A 4/1997 Fost et al.
5,624,676 A 4/1997 Mackey et al.
5,635,191 A 6/1997 Roe et al.
5,635,469 A 6/1997 Fowler et al.
5,637,194 A 6/1997 Ampulski et al.
5,643,588 A 7/1997 Roe et al.
5,650,218 A 7/1997 Krzysik et al.
5,656,132 A 8/1997 Farrington, Jr. et al.
5,665,426 A 9/1997 Krzysik et al.
5,667,636 A 9/1997 Engel et al.
5,688,496 A 11/1997 Fost et al.
5,705,164 A 1/1998 Makey et al.
5,707,434 A 1/1998 Halloran et al.
5,707,435 A 1/1998 Halloran
5,725,736 A 3/1998 Schroeder et al.
5,756,112 A 5/1998 Mackey
5,792,737 A 8/1998 Grüning et al.
5,807,956 A 9/1998 Czech
5,814,188 A 9/1998 Vinson et al.
5,830,483 A 11/1998 Seidel et al.
5,840,403 A 11/1998 Trokhan et al.
5,849,313 A 12/1998 Fost et al.
5,856,544 A 1/1999 Czech et al.
5,857,627 A 1/1999 Horwell et al.
5,861,143 A 1/1999 Peterson et al.
5,869,075 A 2/1999 Krzysik
5,871,763 A 2/1999 Luu et al.
5,882,573 A 3/1999 Kwok
5,885,697 A 3/1999 Krzysik et al.
5,893,965 A 4/1999 Trokhan et al.
5,902,540 A 5/1999 Kwok
5,904,298 A 5/1999 Kwok et al.
5,904,809 A 5/1999 Rokman et al.
5,925,469 A 7/1999 Gee
5,932,068 A 8/1999 Farrington, Jr. et al.
5,935,383 A 8/1999 Sun et al.
5,981,044 A 11/1999 Phan et al.
5,981,681 A 11/1999 Czech
5,985,434 A 11/1999 Qin et al.
5,990,377 A 11/1999 Chen et al.
6,017,417 A 1/2000 Wendt et al.

| | | | | |
|---|---|---|---|---|
| 6,030,675 | A | 2/2000 | Schroeder et al. | |
| 6,033,723 | A | 3/2000 | Kistler et al. | |
| 6,054,020 | A | 4/2000 | Goulet | |
| 6,073,861 | A | 6/2000 | Wright et al. | |
| 6,077,375 | A | 6/2000 | Kwok | |
| 6,080,686 | A | 6/2000 | Floyd | |
| 6,090,885 | A | 7/2000 | Kuo et al. | |
| 6,103,128 | A | 8/2000 | Koso et al. | |
| 6,120,784 | A | 9/2000 | Snyder, Jr. | |
| 6,126,784 | A * | 10/2000 | Ficke et al. | 162/184 |
| 6,132,803 | A | 10/2000 | Kelly et al. | |
| 6,136,147 | A | 10/2000 | Edwards et al. | |
| 6,179,961 | B1 | 1/2001 | Ficke et al. | |
| 6,183,814 | B1 | 2/2001 | Nangeroni et al. | |
| 6,217,707 | B1 | 4/2001 | Garvey et al. | |
| 6,217,940 | B1 | 4/2001 | Kuni | |
| 6,224,714 | B1 | 5/2001 | Schroeder et al. | |
| 6,231,719 | B1 | 5/2001 | Garvey et al. | |
| 6,238,518 | B1 | 5/2001 | Rokman et al. | |
| 6,238,682 | B1 | 5/2001 | Klofta et al. | |
| 6,261,580 | B1 * | 7/2001 | Lehrter et al. | 424/402 |
| 6,306,408 | B1 | 10/2001 | Eichhorn et al. | |
| 6,322,604 | B1 | 11/2001 | Midkiff | |
| 6,395,957 | B1 | 5/2002 | Chen et al. | |
| 6,432,268 | B1 | 8/2002 | Burghardt | |
| 6,432,270 | B1 * | 8/2002 | Liu et al. | 162/164.4 |
| 6,461,476 | B1 * | 10/2002 | Goulet et al. | 162/158 |
| 6,488,812 | B2 * | 12/2002 | Shannon et al. | 162/164.6 |
| 6,495,151 | B2 | 12/2002 | McAtee et al. | |
| 6,514,383 | B1 * | 2/2003 | Liu et al. | 162/164.4 |
| 6,547,928 | B2 | 4/2003 | Barnholtz et al. | |
| 6,599,394 | B1 * | 7/2003 | Liu et al. | 162/158 |
| 6,607,783 | B1 | 8/2003 | VanderHeiden et al. | |
| 6,706,410 | B2 | 3/2004 | Horenziak et al. | |
| 6,949,167 | B2 | 9/2005 | Shannon et al. | |
| 2002/0028230 | A1 | 3/2002 | Eichhorn et al. | |
| 2002/0092635 | A1 | 7/2002 | Capizzi | |
| 2002/0112831 | A1 | 8/2002 | Barnholtz et al. | |
| 2002/0112835 | A1 | 8/2002 | Liu et al. | |
| 2002/0139500 | A1 | 10/2002 | Runge et al. | |
| 2003/0032352 | A1 | 2/2003 | Chang et al. | |
| 2003/0056917 | A1 | 3/2003 | Jimenez | |
| 2003/0077314 | A1 | 4/2003 | Shannon et al. | |
| 2003/0112831 | A1 | 6/2003 | Williams | |
| 2003/0118847 | A1 | 6/2003 | Chuang et al. | |
| 2003/0118848 | A1 | 6/2003 | Liu | |
| 2003/0159796 | A1 | 8/2003 | Watzinger et al. | |
| 2003/0188839 | A1 | 10/2003 | Urscheler | |
| 2003/0188841 | A1 | 10/2003 | Buder et al. | |
| 2003/0221808 | A1 | 12/2003 | Capizzi | |
| 2004/0118532 | A1 | 6/2004 | Sarbo et al. | |
| 2004/0118533 | A1 | 6/2004 | Shannon et al. | |
| 2004/0131842 | A1 | 7/2004 | Urlaub et al. | |
| 2004/0144507 | A1 | 7/2004 | Shannon et al. | |

FOREIGN PATENT DOCUMENTS

| | | | |
|---|---|---|---|
| EP | 0047908 | A1 | 3/1982 |
| EP | 0098362 | B1 | 1/1984 |
| EP | 0120472 | A1 | 10/1984 |
| EP | 0195458 | A1 | 9/1986 |
| EP | 0196576 | B1 | 10/1986 |
| EP | 0333212 | A2 | 9/1989 |
| EP | 0336439 | A2 | 10/1989 |
| EP | 0347153 | B1 | 12/1989 |
| EP | 0347154 | B1 | 12/1989 |
| EP | 0347176 | B2 | 12/1989 |
| EP | 0347177 | B1 | 12/1989 |
| EP | 0643083 | B1 | 3/1995 |
| EP | 1013823 | A1 | 6/2000 |
| EP | 1023863 | A1 | 8/2000 |
| EP | 1059032 | A1 | 12/2000 |
| EP | 1149947 | A2 | 10/2001 |
| EP | 1236827 | A1 | 9/2002 |
| WO | WO 9501478 | A1 | 1/1995 |
| WO | WO 9704171 | A1 | 2/1997 |
| WO | WO 9840207 | A1 | 9/1998 |
| WO | WO 9840425 | A1 | 9/1998 |
| WO | WO 9913158 | A1 | 3/1999 |
| WO | WO 9919081 | A1 | 4/1999 |
| WO | WO 0015907 | A1 | 3/2000 |
| WO | WO 0068503 | A1 | 11/2000 |
| WO | WO 0071177 | A1 | 11/2000 |
| WO | WO 0104416 | A1 | 1/2001 |
| WO | WO 0114631 | A1 | 3/2001 |
| WO | WO 0128337 | A2 | 4/2001 |
| WO | WO 0129315 | A1 | 4/2001 |
| WO | WO 0216689 | A2 | 2/2002 |
| WO | WO 0248458 | A1 | 6/2002 |
| WO | WO 02072951 | A2 | 9/2002 |
| WO | WO 02072951 | A3 | 9/2002 |
| WO | 02077048 | A * | 10/2002 |
| WO | WO 03021037 | A1 | 3/2003 |
| WO | WO 2004044318 | A2 | 5/2004 |
| WO | WO 2004044318 | A3 | 5/2004 |
| WO | WO 2004044321 | A1 | 5/2004 |

OTHER PUBLICATIONS

PCT Search Report for PCT/US03/28239, Mar. 3, 2004.

Article—*Recent Developments in Foam Application Systems*, Gaston County Environmental Systems, 4 pages.

U.S. Appl. No. 10/272,470, filed Oct. 16, 2002, Liu, et al. Method For Applying Softening Compositions To A Tissue Product.

U.S. Appl. No. 10/281,886, filed Oct. 28, 2002, Joseph G. Capizzi, Process For Applying A Liquid Additive To Both Sides Of A Tissue Web.

U.S. Appl. No. 10/289,809, Shannon, et al., Soft Tissue Products Containing Polysiloxane Having A High Z-Directional Gradient.

U.S. Appl. No. 10/289,562, Flugge, et al., Hydrophobically Modified Cationic Acrylate Copolymer/Polysiloxane Blends And Use In Tissue.

U.S. Appl. No. 10/305,790, filed Nov. 27, 2002, Liu, et al., Soft Paper Product Including Beneficial Agents.

PCT Search Report and Written Opinion for PCT/US2004/006913, May 31, 2005.

* cited by examiner

SINGLE PLY TISSUE PRODUCTS SURFACE TREATED WITH A SOFTENING AGENT

BACKGROUND OF THE INVENTION

In the manufacture of tissue products, such as facial tissue, bath tissue, paper towels, dinner napkins and the like, a wide variety of product properties are imparted to the final product through the use of chemical additives. For example, one common attribute imparted to tissue sheets through the use of chemical additives is softness, particularly topical or surface softness.

For instance, in some applications, tissue products are treated with polysiloxanes in order to increase the softness of the tissue.

In some applications, tissue products may be treated with other beneficial agents as well. For example, in addition to softening agents such as polysiloxane lotions, other desirable agents may be added to a tissue in order to provide a benefit to the user. For example, vitamins, plant extracts, medications, antimicrobial compounds, and the like may also be added to the web in order to transfer the desired agent to the consumer upon use.

In the papermaking industry, various manufacturing techniques have been specifically designed to produce paper products which consumers find appealing. Manufacturers have employed various methods to apply chemical additives, such as silicone compositions and other beneficial agents, to the surface of a tissue web. Currently, one method of applying chemicals to the surface of a tissue web is the rotogravure printing process. A rotogravure printing process utilizes printing rollers to transfer chemicals onto a substrate. Chemicals that are applied to webs using the rotogravure printing process typically require the addition of water, in combination with, surfactants, in order to prepare an emulsion capable of being applied onto the substrate using conventional technologies. Such additions are not only costly but also increase wet-out time, drying time, and add process complexity.

A similar method to rotogravure printing is also known in the art. In this method the polysiloxane emulsion is applied to a heated transfer roll to remove some of the solvent (water). The concentrated silicone emulsion is then transferred from the heated transfer roll to the surface of the tissue. While this process may provide some benefits from the drying time required by the conventional rotogravure process it still requires the use of dilute solutions emulsions containing surfactants and therefore does not address the issues of additional chemicals, increased wet out times and process complexity. Additionally, both the rotogravure and transfer roll process require the tissue to be subjected to Z-directional compressive forces which in combination with the water, surfactants and other diluents present tend to reduce the bulk of the finished product. In addition, these Z-directional compressive forces tend to drive the chemicals into the bulk of the tissue whereby the chemical can penetrate a significant distance into the Z-direction of the sheet. As the softening agents applied in this manner are intended to improve the surface feel, the chemical that penetrates in the Z-direction of the sheet is not effective and hence more chemistry is required than if it were all retained on the tissue surface.

Another method of applying chemical additives to the surface of a tissue web is spray atomization. Spray atomization is the process of combining a chemical with a pressurized gas to form small droplets that are directed onto a substrate, such as paper. One problem posed with atomization processes is that manufacturers often find it difficult to control the amount of chemical that is applied to a paper ply. Thus, a frequent problem with spray atomization techniques is that a large amount of over-spray is generated, which undesirably builds upon machinery as well as the surfaces of equipment and products in the vicinity of the spray atomizer. Furthermore, over-spray wastes the chemical being applied, and comprises a generally inefficient method of applying additives to a tissue web.

In addition, many spray atomization devices produce a wide spectrum of droplet diameters. The variability in droplet size makes it difficult to control the amount of chemical additive that is applied to the product. Further, lack of control over the spray atomization technique also affects the uniformity of application to the tissue web.

In view of the above, a need exists in the industry for improving the method for application of chemical additives to the surface of a paper web. Further, a need also exists for tissue products with improved properties due to the manner in which a chemical additive is applied to the product. For example, it is believed that controlled surface application of a softening agent, such as a polysiloxane, may lead to the development of a tissue product having improved surface properties while lowering the levels of the chemical additive needed for a given level of performance.

SUMMARY OF THE INVENTION

In general, the present invention is directed to an improved process for applying compositions to tissue products, such as facial and bath tissues, paper towels and other wipers. The present invention is also directed to improved tissue sheets made from the process.

In one embodiment, for instance, the present invention is directed to a single ply tissue web containing cellulosic fibers. The cellulosic fibers may be hardwood fibers, softwood fibers, or mixtures thereof. The tissue web can have a basis weight of from about 5 gsm to about 200 gsm, such as from about 5 gsm to about 80 gsm. The tissue web can also have a bulk of greater than about 2 cc/g and in specific embodiments greater than about 7 cc/g. The tissue web includes a first side, a center, and a second and opposite side.

In accordance with the present invention, a softening agent is present at the first side and at the second side of the tissue web. The softening agent is distributed non-uniformly across the thickness of the tissue web so as to form a gradient in the Z-direction of the web. The softening agent, for instance, may be present at the first and second sides of the web in an amount that is at least 15% (atomic amount) greater than the amount of softening agent contained at the center of the web. In various embodiments, for instance, the softening agent may be present at the first and second sides of the web in an amount that is at least 25% greater, 50% greater, or even 70% greater than the amount of softening agent contained at the center of the single ply web.

Various different softening agents may be used in accordance with the present invention. In one embodiment, the softening agent is a polysiloxane. The polysiloxane may be topically applied to each side of the tissue web, may cover from about 0.5% to about 80% of the surface area of each side, and may be added to the tissue web in an amount from about 0.05% to about 5% by weight of dry fibers. In one embodiment, the polysiloxane may be combined with a skin beneficial agent, such as aloe vera, vitamin E, petrolatum, and mixtures thereof.

In one embodiment, the softening agent, such as polysiloxane, may be applied to the tissue web in a neat form. In this embodiment, a tissue web may be constructed containing virtually no surfactants. For example, the tissue web may have a total surfactant content of less than about 0.08% by weight, more specifically about less than 0.05% by weight and still more specifically less than about 0.025% by weight of the dry fibers. Even without the presence of surfactants, the tissue web can have a Wet Out Time of less than about 10 seconds, such as less than about 8 seconds.

The softening agent may be applied topically to each side of the tissue web using, for instance, an extruder such as a meltblown die. In this manner, the softening agent may form a random continuous network on each side of the tissue web. The softening agent may form, for instance, continuous filaments across the surface of each side of the web.

The present invention is also directed to a cleaning device for cleaning a chemical additive applicator, such as a meltblown die, that is intended to apply chemical additives to tissue webs. In one embodiment, for instance, the apparatus of the present invention includes a conveying device for supporting and moving a web. A chemical additive applicator is positioned in relation to the conveying device so as to apply a chemical additive to the moving web. The chemical additive applicator comprises a row of orifices for emitting the chemical additive. The apparatus further includes a cleaning device for periodically removing debris from the row of orifices of the chemical additive applicator. The cleaning device, for instance, comprises a brush that traverses across the orifices.

The brush may be mounted on a track for traversing across the chemical additive applicator. In one embodiment, the brush may also rotate as it traverses across the applicator. In an alternative embodiment, the brush may have a width that is substantially the same width as the chemical additive applicator and may move back and forth across the applicator for cleaning the orifices. In this embodiment, the brush may include a continuous row of bristles or may be comprised of separate segments. Further, instead of moving back and forth, the brush may also be configured to rotate about an axis for cleaning the die head. In this embodiment, the brush may transition between a cleaning position and a disengagement position.

The above described brush may be used in combination with a plurality of fluid (liquid or gas) jet nozzles and/or a vacuum device. The fluid nozzles, for instance, may be positioned adjacent to the row of orifices on the chemical additive applicator and may be configured to emit a fluid against the orifices for cleaning them periodically. Similarly, a vacuum device may include at least one suction chamber also mounted adjacent to the orifices for removing debris and other contaminates. In one particular embodiment, the fluid nozzles and/or the vacuum nozzles may be mounted directly on the brush for assisting the brush in cleaning the chemical additive applicator.

BRIEF DESCRIPTION OF THE DRAWINGS

A full and enabling disclosure of this invention is set forth in this specification. The following Figure illustrate the invention.

Figure 1:
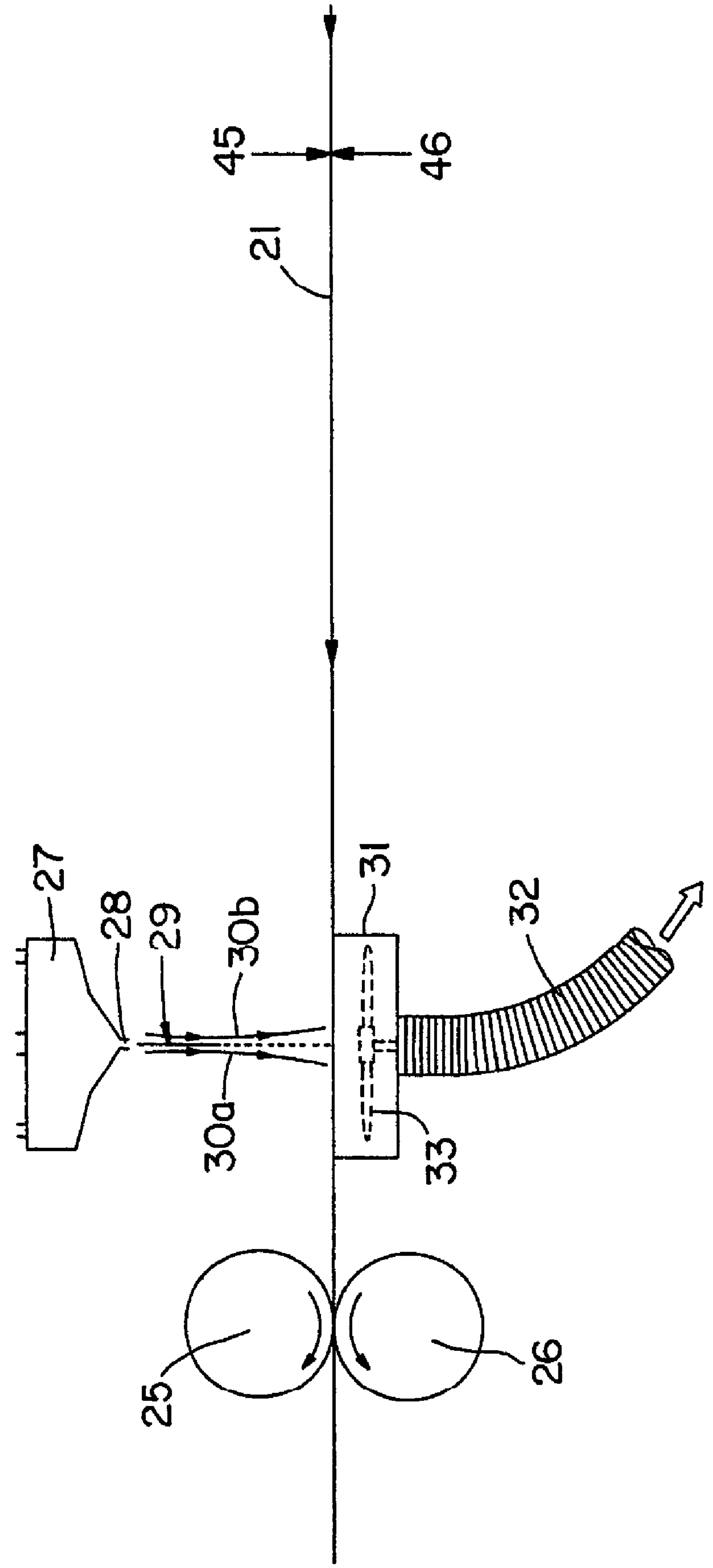
FIG. 1 is a schematic drawing showing application of a viscous composition through a meltblown die tip onto a paper web in accordance with the present invention.

Repeated use of reference characters in the present specification and drawings is intended to represent the same or analogous features of the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations may be made in the invention without departing from the scope or spirit of the invention. For instance, features illustrated or described as part of one embodiment may be used in another embodiment to yield a still further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied in the exemplary constructions.

In general, the present invention is directed to applying viscous chemical compositions on to a tissue sheet, such as a single ply tissue web using, for instance, a meltblown die. It has been found that when compared with the rotogravure printing process and the spray atomization process, the meltblown process is more efficient.

For example, in comparison to the rotogravure printing process, the process of the present invention for applying compositions to tissue webs may be simpler and less complex. The process of the present invention also provides more flexibility with respect to operation parameters. For instance, it has been found that the process of the present invention provides better controls over flow rates and add on levels of the compositions being applied to the tissue webs. In some applications, the process of the present invention may also allow the compositions to be applied to the tissue webs at higher speeds in comparison to many rotogravure printing processes.

In comparison to spray atomization processes, the process of the present invention may provide greater control over application rates and may apply compositions to tissue webs more uniformly. The process of the present invention also may better prevent against over application of the composition and may provide better controls over placement of the composition onto the web.

Another advantage to the process of the present invention is that the process is well suited to applying relatively high viscous chemical additives to tissue webs. Thus, it has been discovered that additives may be applied to tissue webs without first combining the additives with anything which could dilute the additives, e.g., solvents, surfactants, preservatives, antifoamers, and the like.

Such diluents required for application via conventional technologies allows, among other problems, the additive to penetrate the Z-direction of the sheet. For surface treatment it is desirable to keep material from penetrating the bulk of the tissue sheet. For application of lotions containing oils and waxes it is known to apply waxes that are solids at room temperature by melting the lotion. These lotions have a relatively low melting point, generally less than 70° C. and show Newtonian behavior where the viscosity drops quickly with increasing temperature. Hence, in the heated state they can be applied via conventional technologies. During application to the sheet rapid cooling and crystallization can keep more lotion on the surface of the tissue sheet to aid transfer to the user's skin.

For polysiloxanes, it is believed that the molecular weight (MW) of the polysiloxane has a direct relationship to the softness properties delivered. Hence, the higher the MW, the higher the viscosity, and the better the softness impact provided by the polysiloxane. Unfortunately, polysiloxanes do not demonstrate good Newtonian behavior and thus their viscosity does not change significantly with increasing temperature. Hence, high molecular weight or high viscosity polysiloxanes are incapable of being added using conventional technologies without the presence of a diluent such as an emulsifier and water mixture. The process of the present invention may be more economical and less complex than many conventional application systems and further allows for the application of high viscosity polysiloxanes without the need for additional diluents.

In one embodiment, a composition containing a chemical additive in accordance with the present invention may be applied to a tissue sheet in the form of fibers, such as, for instance, in the form of continuous fibers. Specifically, it has been discovered that under certain circumstances, compositions applied in accordance with the present invention will fiberize when extruded through the meltblown die tip. The ability to fiberize the compositions provides various advantages. For example, when formed into fibers, the composition is easily captured by the sheet. The fibers may also be placed on the sheet in specific locations. Further, when desired, the fibers will not penetrate through the entire thickness of the sheet, but instead, will remain on the surface of the sheet, where the chemical additives are intended to provide benefits to the consumer. For example, more than about 70% of the composition applied to the sheet in the form of fibers may remain on the surface of the treated sheet.

Once deposited on a tissue sheet, the fibers can take various forms. In one embodiment, for instance, the fibers appear randomly deposited over the surface of the tissue sheet in an intersecting network. In one embodiment, for instance, small pools of the chemical additive may form on the surface of the sheet. Strands or fibers of the chemical additive may then extend from the pools and possibly intersect with other pools that are present. When deposited on the paper web, the fibers may be very sinuous appearing as thread-like filaments containing multiple curvatures.

Although multiple ply products may be made in accordance with the present invention, in one particular embodiment, the present invention is directed to a single ply tissue product that has been treated on both sides with a chemical additive as described above. By applying a chemical additive, such as a softening agent, primarily to the surface of a single ply web, single ply tissue products can be produced that have improved softness at a lower level of additive and higher bulk. Improved softness at lower levels of additive arises from reduced bulk penetration of the softening agent.

For example, single ply tissue products can be produced having a chemical additive content that is at a minimum at the center of the sheet and extends to a maximum at both exterior surfaces. More particularly, chemical additives can be applied to a single ply web in a manner that forms a Z-directional gradient. The Z-directional gradient may be determined by X-ray photoelectron spectroscopy (XPS) as described hereinafter. Surface additive levels are reported as atomic concentration as determined by the spectrometer. The atomic concentration is measured to a depth of about 100 nanometers and is indicative of the additive content at the surface of the tissue web. Z-directional gradients are defined as a percent difference in atomic concentration between the exterior surfaces of the tissue web and the middle of the web. The Z-directional gradient is defined via the following equation:

$$\text{Z-directional gradient}=(x-y)/x*100$$

wherein X is the atomic percent additive on the highest content outside surface of the web and Y is the atomic percent additive in the middle of the tissue web. The higher the percent of the Z-directional additive gradient indicates more of the additive on the surface of the tissue web in relation to the amount of additive contained in the center of the web.

In accordance with the present invention, a soft, single ply tissue product may be formed in which a chemical additive, such as a softening agent, is present on both exterior surfaces of the product, but is non-uniformly distributed throughout the thickness of the product. In particular, tissue products can be made according to the present invention having a percent Z-directional additive gradient between the exterior surfaces of the product and the center of the product in an amount of about 15% or greater, such as in an amount of about 25% or greater. In some embodiments, for instance, the Z-directional gradient between the exterior surfaces of the single ply web and the center of the web may be greater than about 50%, and even greater than about 70%.

Another advantage of the present invention is that for some applications, a lesser amount of the chemical additive may be applied to the web than what was necessary in typical rotogravure processes while still obtaining an equivalent or better result. In particular, it is believed that since the chemical additive may be applied in a relatively viscous form without having to be formed into an emulsion or a solution and because the chemical additive may be applied as fibers uniformly over the surface of a web, it is believed that the same or better results may be obtained without having to apply as much of the chemical additive as was utilized in many prior art processes. For example, a softener may be applied to a web in a lesser amount while still obtaining the same softening effect in comparison to rotogravure processes and spray processes. In addition, the product also may have better wettability, as may be measured by wet-out time. Further, since less of the chemical additive is needed, additional cost savings are realized.

In one aspect of the present invention, a composition containing a chemical additive is applied to a tissue web. The chemical additive, may be, for instance, a softener. By applying the composition in a heterogeneous manner on the tissue surface, a tissue may be produced not only having a lotiony, soft feel, but also having good wettability.

In one embodiment of the present invention, more than one chemical additive may be combined and applied to a web. For example, a softener, such as a polysiloxane softener may be combined with one or more chemical agents which may provide a desired benefit to the consumer and then the combination may be applied to a tissue web according to the present invention.

Possible beneficial agents that may be applied to tissue webs in accordance with the present invention include, without limitation, anti-acne actives, antimicrobial actives, antifungal actives, antiseptic actives, antioxidants, cosmetic astringents, drug astringents, deodorants, emollients, external analgesics, film formers, fragrances, humectants, natural moisturizing agents and other skin moisturizing ingredients known in the art such as lanolin, skin conditioning agents, skin exfoliating agents, skin protectants, and sunscreens. More specifically, vitamin E and aloe vera extracts are examples of beneficial agents which may be applied to a surface of a web according to the present inventive process.

The above chemical additives may be applied alone or in combination with other additives in accordance with the present invention. For example, the desired polysiloxane softeners may be mixed with the desired beneficial agents and applied together as a single composition. Alternatively, the softeners and beneficial agents may be applied separately, creating layers of additives on the surface of the tissue web.

In one embodiment of the present invention, the process is directed to applying one or more softeners and one or more beneficial agents to a tissue web. The softener may be, for instance, a polysiloxane that makes a tissue product feel softer to the skin of a user. Suitable polysiloxanes that may be used in the present invention include amine, aldehyde, carboxylic acid, hydroxyl, alkoxyl, polyether, polyethylene oxide, and polypropylene oxide derivatized silicones, such as aminopolydialkylsiloxanes. When using an aminopolydialkysiloxane, the two alkyl radicals may be methyl groups, ethyl groups, and/or a straight branched or cyclic carbon chain containing from about 3 to about 8 carbon atoms. Some commercially available examples of polysiloxanes include WETSOFT CTW, AF-21, AF-23 and EXP-2025G of Kelmar Industries, Y-14128, Y-14344, Y-14461 and FTS-226 of the Crompton Corporation, and Dow Corning 8620, Dow Corning 2-8182, Dow Corning HMW2220 and Dow Corning 2-8194 of the Dow Corning Corporation.

Polysiloxanes encompass a very broad class of compounds. They are characterized in having a backbone structure:

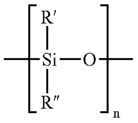

where R' and R" can be a broad range of organo and non-organo groups including mixtures of such groups and where n is an integer greater than 2. These polysiloxanes may be linear, branched or cyclic. They include a wide variety of polysiloxane copolymers containing various compositions of functional groups, hence, R' and R" actually may represent many different types of groups within the same polymer molecule. The organo or non-organo groups may be capable of reacting with cellulose to covalently, ionically or hydrogen bond the polysiloxane to the cellulose. These functional groups may also be capable of reacting with themselves to form crosslinked matrixes with the cellulose. In one embodiment, for instance, when R' and R" are alkyl groups, such as $C_1$-$C_{30}$ linear or branched alkyl groups, the polysiloxane component is referred to as a polydialkylsiloxane component. The scope of the invention, however, should not be construed as limited by a particular polysiloxane structure so long as that polysiloxane structure delivers the aforementioned product or process benefits While not wishing to be bound by theory, the softness benefits that polysiloxanes deliver to cellulose containing products is believed to be, in part, related to the molecular weight of the polysiloxane. Viscosity is often used as an indication of molecular weight of the polysiloxane as exact number or weight average molecular weights are often difficult to determine. The viscosity of the polysiloxanes of the present invention is greater than about 50 centipoise, more preferably greater than 100 centipoise and most preferably greater than 200 centipoise. In one embodiment the viscosity of the polysiloxane is greater than about 1500 centipoise. Viscosity as referred to herein refers to the viscosity of the neat polysiloxane itself and not to the viscosity of an emulsion if so delivered. It should also be understood that the polysiloxanes of the current invention may be delivered as solutions containing diluents. Such diluents may lower the viscosity of the solution below the limitations set above, however, the efficacious part of the polysiloxane should conform to the viscosity ranges given above. Examples of such diluents include but is not limited to oligomeric and cyclo-oligomeric polysiloxanes such as octamethylcyclotetrasiloxane, octamethyltrisiloxane, decamethylcyclopentasiloxane, decamethyltetrasiloxane and the like including mixtures of said compounds.

A specific class of polysiloxanes suitable for the invention has the general formula:

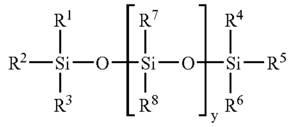

Wherein the $R^1$-$R^8$ moieties can be independently any organofunctional group including $C_1$ or higher alkyl groups, ethers, polyethers, polyesters, amines, imines, amides, or other functional groups including the alkyl and alkenyl analogues of such groups and y is an integer >1. Preferably the $R^1$-$R^8$ moieties are independently any $C_1$ or higher alkyl group including mixtures of said alkyl groups, such materials referred to as polydialkylsiloxanes. Exemplary polysiloxanes are the DC-200 fluid series, manufactured and sold by Dow Corning, Inc. As softness is believed to be at least in part related to the molecular weight of the polysiloxane, especially preferred compounds are high MW linear polydialkylsiloxanes such as DC-HMW2220 sold by Dow Corning, Inc.

Functionalized polysiloxanes and their aqueous emulsions are well known commercially available materials. So called amino functional polysiloxanes having the following structure are well suited for the purposes of the present invention and are well known in the art and readily available:

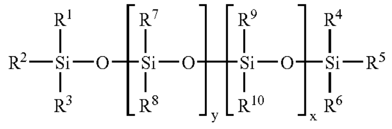

Wherein, x and y are integers >0. The mole ratio of x to (x+y) can be from about 0.005 percent to about 25 percent. The $R^1$-$R^9$ moieties can be independently any organofunctional group including $C_1$ or higher alkyl groups, ethers, polyethers, polyesters, amines, imines, amides, or other functional groups including the alkyl and alkenyl analogues of such groups. The $R^{10}$ moiety is an amino functional moiety including but not limited to primary amine, secondary amine, tertiary amines, quaternary amines, unsubstituted amides and mixtures thereof. An exemplary $R^{10}$ moiety contains one amine group per constituent or two or more amine groups per substituent, separated by a linear or branched alkyl chain of $C_1$ or greater. When $R^7$ and $R^8$ are alkyl groups such as $C_1$-$C_8$ alkyl groups the polysiloxanes are hereinafter referred to as aminofunctional polysiloxanes, more specifically amino functional polydialkylsiloxanes. Exemplary materials include DC 2-8220 and DC 2-8182 commercially available from Dow Corning, Inc., Midland, Mich. and Y-14344 available from Crompton, Corp., Greenwich, Conn.

Another exemplary class of functionalized polysiloxanes is the polyether polysiloxanes. Such polysiloxanes are again widely taught in the art and are usually incorporated wholly or in part with other functional polysiloxanes as a means of improving hydrophilicity of the silicone treated product. Such polysiloxanes generally have the following structure:

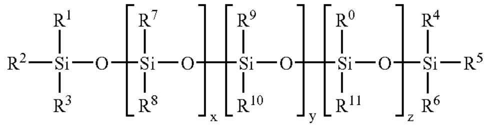

Wherein, x and z are integers >0, y is an integer 0. The mole ratio of x to (x+y+z) can be from about 0.05 percent to about 95 percent. The ratio of y to (x+y+z) can be from about 0 percent to about 25%. The $R^0$-$R^9$ moieties can be independently any organofunctional group including $C_1$ or higher alkyl groups, ethers, polyethers, polyesters, amines, imines, amides, or other functional groups including the alkyl and alkenyl analogues of such groups. The $R^{10}$ moiety is an amino functional moiety including but not limited to primary amine, secondary amine, tertiary amines, quaternary amines, unsubstituted amides and mixtures thereof. An exemplary $R^{10}$ moiety contains one amine group per constituent or two or more amine groups per substituent, separated by a linear or branched alkyl chain of $C^1$ or greater. $R^{11}$ is a polyether functional group having the generic formula: $R^{12}$—$(R^{13}$—$O)_a$—$(R^{14}O)_b$—$R^{15}$, wherein $R^{12}$, $R^{13}$, and $R^{14}$ are independently $C_{1-4}$ alkyl groups, linear or branched; $R^{15}$ can be H or a $C_{1-30}$ alkyl group; and, "a" and "b" are integers of from about 1 to about 100, more specifically from about 5 to about 30.

When $R^7$-$R^8$ are alkyl groups such as $C_1$-$C_8$ alkyl groups, and y and z are both >0 the polysiloxanes are usually referred to as amino functional polyetherpolydialkylsiloxane copolymers. Such definition also applies to cases where y=0 but $R^{11}$ contains amine functional polyether groups.

Exemplary aminofunctional polyetherpolysiloxanes and aminofunctional polyetherpolydialkylsiloxanes are the Wetsoft CTW family manufactured and sold by Wacker, Inc., Adrian, Mich. Other exemplary polysiloxanes can be found in U.S. Pat. No. 6,432,270 by Liu, et. al, and incorporated by reference herein.

In a specific embodiment, a polysiloxane softener of the following general chemical structure may be utilized in the process of the present invention:

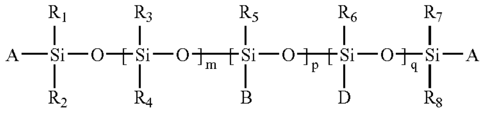

wherein,

A is hydrogen; hydroxyl; or straight chain, branched or cyclic, unsubstituted or substituted, $C_1$-$C_8$ alkyl or alkoxy radicals;

$R_1$-$R_8$ are independently, a straight chain, branched or cyclic, unsubstituted or substituted, $C_1$-$C_6$ alkyl radical;

m is from 20 to 100,000;

p is from 1 to 5,000;

q is from 0 to 5,000;

B is the following:

$$—R_9—[(OC_2H_5)_r—(OC_3H_7)_s]_t\text{-}G\text{-}(R_{10})_z\text{-}W$$

wherein, t=0 or 1;

z is 0 or 1;

r is from 1 to 50,000;

s is from 0 to 50,000;

$R_9$ is a straight chain, branched or cyclic, unsubstituted or substituted, $C_2$-$C_8$ alkylene diradical;

$R_{10}$ is a straight chain, branched or cyclic, unsubstituted or substituted, $C_2$-$C_8$ alkylene diradical or an alkyl cyclic ethereal radical;

G is oxygen or $NR_{11}$, where $R_{11}$ is hydrogen or a straight chain, branched or cyclic, unsubstituted or substituted, $C_1$ to $C_8$ alkyl radical;

when z=0, W is hydrogen or a straight chain, branched or cyclic, unsubstituted or substituted, $C_1$ to $C_{22}$ alkyl radical;

when z=1, W is hydrogen, an $—NR_{12}R_{13}$ radical, or an $—NR_{14}$ radical;

wherein, $R_{12}$ and $R_{13}$ are independently, hydrogen or a straight chain, branched or cyclic, unsubstituted or substituted, $C_1$-$C_8$ alkyl radical; and $R_{14}$ is a straight chain, branched or cyclic, unsubstituted or substituted, $C_3$ to $C_8$ alkylene diradical that forms a cyclic ring with the nitrogen;

D is the following:

$$—R_{15}—(OC_2H_5)_x—(OC_3H_7)_y—O—R_{16}$$

wherein, x is from 1 to 10,000;

y is from 0 to 10,000;

$R_{15}$ is a straight chain, branched or cyclic, unsubstituted or substituted, $C_2$-$C_8$ alkylene diradical, and $R_{16}$ is hydrogen or a straight chain, branched or cyclic, unsubstituted or substituted, $C_1$-$C_8$ alkyl radical.

Moreover, in some embodiments, a polysiloxane having the following general structure may also be utilized in the present invention:

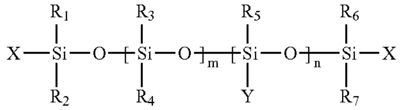

wherein,

X is hydrogen; hydroxyl; or straight chain, branched or cyclic, unsubstituted or substituted, $C_1$-$C_8$ alkyl or $C_1$-$C_8$ alkoxyl radical;

$R_1$-$R_7$ are independently, a straight chain, branched or cyclic, unsubstituted or substituted, $C_1$-$C_6$ alkyl radical;

m is 10 to 100,000;

n is 0 to 100,000;

Y is the following:

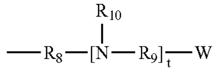

or $$—R_{11}—(OC_2H_5)_r—(OC_3H_7)_s—O\text{-}Z$$

wherein, t is 0 or 1;

r is 10 to 100,000;

s is 10 to 100,000;

$R_8$, $R_9$, and $R_{11}$ are independently, a straight chain, branched or cyclic, unsubstituted or substituted, $C_2$-$C_8$ alkylene diradical;

$R_{10}$ is hydrogen or a straight chain, branched or cyclic, unsubstituted or substituted, $C_1$-$C_8$ alkyl radical;

W is the following:

$$—NR_{12}R_{13}$$

or $$—NR_{14}$$

wherein, $R_{12}$ and $R_{13}$ are independently, hydrogen or a straight chain, branched or cyclic, unsubstituted or substituted, $C_1$-$C_8$ alkyl radical, or an acyl radical; and $R_{14}$ is a straight chain, branched or cyclic, unsubstituted or substituted, $C_3$-$C_6$ alkylene diradical; and Z is hydrogen or a straight chain, branched or cyclic, unsubstituted or substituted, $C_1$-$C_{24}$ alkyl radical.

In the past, polysiloxanes were typically combined with water, preservatives, antifoamers, and surfactants, such as nonionic ethoxylated alcohols, to form stable and microbial-free emulsions and applied to tissue webs. Since the process of the present invention may accommodate higher viscosities, however, the polysiloxanes may be added directly to a tissue web or to another paper product without having to be combined with water, a surfactant or any other agent. For example, neat compositions, such as a neat polysiloxane composition or a neat beneficial agent may be applied to the surface of the web separately in any desired order in accordance with the present invention. In an alternative embodiment, a mixed composition including only a polysiloxane and a beneficial agent may be prepared and applied together in a single layer. Since the polysiloxane and the beneficial agents may be applied to a web without having to be combined with any other ingredients, the process of the present invention may be more economical and less complex than many prior processes. Further, as described above, it has also been discovered that lesser amounts of the chemical additives may be applied to the web while still obtaining the same or better results, which may provide additional cost savings.

In fact, in one embodiment, the present invention is directed to a tissue product, such as a single ply tissue web, that contains no appreciable amounts of surfactants. For instance, in one embodiment, the present invention is directed to a single ply tissue product having a polydialkylsiloxane content of greater than about 0.1% while also having a surfactant content of less than about 10% by weight of the amount of polydialkylsiloxane present in the web, in another embodiment less than about 5% by weight the amount of polydialkylsiloxane present in the web and in still another embodiment less than about 2% by weight of the amount of polysiloxane present in the web. For instance, the tissue web may have a polydialkylsiloxane content of from 0.3% and can have a surfactant concentration of less than about 0.03%, such as less than about 0.015%, or such as less than about 0.006%.

By polydialkylsiloxane it is meant the portion of the polysiloxane comprising dialkylsiloxane monomer units of the formula:

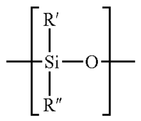

where R' and R" are independently $C_1$-$C_{30}$ groups including mixtures of said alkyl groups. In a specific example R' and R" are $CH_3$ and the polysiloxane component is referred to as polydimethylsiloxane. The polydialkylsiloxane content can be measured by converting the dialkylsiloxane component to diflourodialkylsilane with $BF_3$ and measuring the level of the diflourodialkylsilane with gas chromatography as hereinafter described.

As used herein, a surfactant generally refers to a composition that reduces the surface tension of liquids, or reduces interfacial tension between two liquids or a liquid and a solid. The presence of surfactants in tissue products is not necessarily unfavorable. For instance, the incorporation of surfactants, particularly ionic surfactants, into tissue sheets may provide various advantages. The one embodiment, for instance, surfactants may be used for their debonding properties. In fact, many commercially available debonders act as cationic surfactants.

Many materials, and particular polysiloxanes are emulsified with non-ionic emulsifiers or surfactants. The non-ionic surfactants generally do not assist in improving the handfeel of the tissue product. They are also not substantive in the wet end of the process and therefore their presence indicates application via some sort of post treatment process after web formation. Examples of non-ionic surfactants include, but are not limited to polyoxyethylene alkylamines, trialkylamine oxides, triethanol amine fatty acid esters and partial fatty acid esters, polyoxyethylene alkyl ethers such as those obtained by ethoxylation of long chain alcohols, polyoxyethylene alkenyl ethers, alkylphenyl ethoxylates, polyoxyethylene polystyriphenyl ethers, polypropylene glycol fatty acid esters and alkyl ethers, polyethylene glycol fatty acid esters and alkyl ethers, polyhydric alcohol fatty acid partial esters and alkyl ethers, glycerin fatty acid esters, polyglycerin fatty acid esters, polyoxyethylene polyhydric alcohol fatty acid partial esters and alkyl ethers, polyoxyethylene sorbitan fatty acid esters, polyoxyethylene glycerin fatty acid esters, polyoxyethylene fatty acid esters and alkyl ethers, polyglycerin fatty acid esters, ethoxylated/propoxylated vegetable oils and the like including mixtures of said surfactants.

Non-ionic surfactant concentration in the tissue can be determined using a variety of methods or appropriate commercially available test kits as described hereinafter. An example of one such kit is the Dr. Lange non-ionic test solutions available from Dr. Bruno Lange, GmbH, Dusseldorf, Germany. Levels of non-ionic surfactant are determined by extraction of the surfactant from the tissue web with water and measuring the absorbency of the filtrate at a wavelength of 620 nm after treatment with the components of the kit. The absorption at 620 nm is directly related to the concentration of non-ionic surfactant in the tissue web. Specifically the products of the present invention have filtrates having an absorbency of less than about 0.16, more specifically less than about 0.13 and still more specifically less than about 0.10 or an absorbency to polydialkylsiloxane content ratio of less than about 0.75, more specifically less than about 0.65 and still more specifically less than about 0.50.

Examples of ionic surfactants include primary, secondary and tertiary amine salts of the corresponding alkyl amines, alkyltrimethyl ammonium salts, dialkyldimethyl benzonium salts, dialkyldimethyl ammonium salts, trialkylmethyl ammonium salts, tetra alkyl ammonium salts, polyethylenepolyamine fatty acid amide salts, fatty acid salts, alkylbenzenesulfonates, dialkylsulfosuccinates, alkylsulfonates, N-acyl-N-methyltaurate, alkylsulfates, sulfonated fats and oils, polyoxyethylene alkylether sulfonates, polyoxyethylene styrenated phenyl ether sulfonates, alkyphosphates, polyoxyethylene alkyl phenyl ether phosphates, N,N-dimethyl-N-alkyl-N-carboxymethylammonium betaines, N,N-dialkylaminoalkylene carboxylates, N,N,N-trialkyl-N-sulfoalkeneammonium betaines, N,N-dialkyl-N,N-bispolyoxyethyleneammonium sulfate ester betaines, and the like including mixtures of such surfactants.

In the past, polysiloxanes and other additives were also used sparingly in some applications due to their hydrophobicity. For instance, problems have been experienced in applying polysiloxane softeners to bath tissues due to the adverse impact upon the wettability of the tissue. By applying the polysiloxanes as fibers at particular areas on the web, however, it has been discovered that hydrophobic compositions may be applied to tissue webs for improving the properties of the webs while maintaining acceptable wettability properties. In particular, as will be described in more detail below, in one embodiment of the present invention, a hydrophobic composition may be applied in a discrete, discontinuous, or heterogeneous manner to a tissue web in order to maintain a proper balance between improving the properties of the web through the use of the composition and maintaining acceptable absorbency and wettability characteristics. For instance, a composition may be applied to a surface of the web in such a fashion so as to apply varying amounts of the composition to the web at different surface locations. For example, the web may have composition in the form of fibers covering sections of the web, and no composition at other areas of the web, such as between the individual fibers which are extruded onto the web surface. In other words, the composition can cover the web in a heterogeneous fashion, with composition coverage varying across the surface of the web.

Referring to FIG. 1, one embodiment of a process in accordance with the present invention is illustrated. As shown, a tissue web 21 moves from the right to the left and is comprised of a first side 45 that faces upwards and a second side 46 that faces downward. The tissue web 21 receives a viscous composition stream 29 upon its first side 45.

In general, the composition stream 29 is applied to the web 21 after the web has been formed. The composition may be applied to the web, for instance, after the web has been formed and prior to being wound. Alternatively, the composition may be applied in a post treatment process in a rewinder system.

For example, the chemical composition may be applied prior to the drying section of the tissue process where the tissue web has a consistency of from about 10% to about 60%. In another embodiment, the chemical composition may be applied in the drying section of the tissue web where the tissue web has a consistency of about 30% to about 100%. In still another embodiment of the present invention, the chemical composition may be applied to the tissue web after being dried but before being wound where the tissue web has a consistency of about 90% to about 100%. When the chemical composition is applied via a secondary post treatment process, the tissue web may have a consistency of from about 90% to about 100%.

As illustrated in FIG. 1, the web 21 may be calendered, using calender rolls 25 and 26 subsequent to application of the composition. Alternatively, the web may be calendered and thereafter the composition may be applied to the web. The calender rolls may provide a smooth surface for making the product feel softer to a consumer.

In this embodiment, a single composition containing one or more polysiloxane softeners optionally combined with one or more beneficial agents is extruded to form a composition stream 29 that is directed onto the web 21. In general, any suitable extrusion device may be used in accordance with the present invention. In one embodiment, for instance, the extruder includes a meltblown die 27. A meltblown die is an extruder that includes a plurality of fine, usually circular, square or rectangular die capillaries or nozzles that may be used to form fibers. In one embodiment, a meltblown die may include converging high velocity gas (e.g. air) streams which may be used to attenuate the fibers exiting the nozzles. One example of a meltblown die is disclosed, for instance, in U.S. Pat. No. 3,849,241 to Butin, et al which is incorporated herein by reference.

As shown in FIG. 1, meltblown die 27 extrudes the viscous composition stream 29 from die tip 28. As illustrated, the meltblown die may be placed in association with air curtain 30*a-b*. The air curtain 30*a-b* may completely surround the extruded composition stream 29, while in other applications the air curtain 30*a-b* may only partially surround the composition stream 29. When present, the air curtain may facilitate application of the composition to the tissue web, may assist in forming fibers from the composition being extruded and/or may attenuate any fibers that are being formed. Depending upon the particular application, the air curtain may be at ambient temperature or may be heated.

An exhaust fan 31 is provided to improve air flow and to employ a pneumatic force to pull the composition stream 29 down on to the first side 45 of the tissue web 21. In FIG. 1, for exemplary purposes only, the exhaust fan 31 is shown contained within a vacuum box. It should be understood, however, that the exhaust fan may be located downstream from the vacuum box if desired. The exhaust fan 31 serves to remove from the immediate vicinity airborne particles or other debris through an exhaust duct 32. The exhaust fan 31 operates by pulling air using the rotating propeller 33 shown in dotted phantom in FIG. 1.

Figure 2:
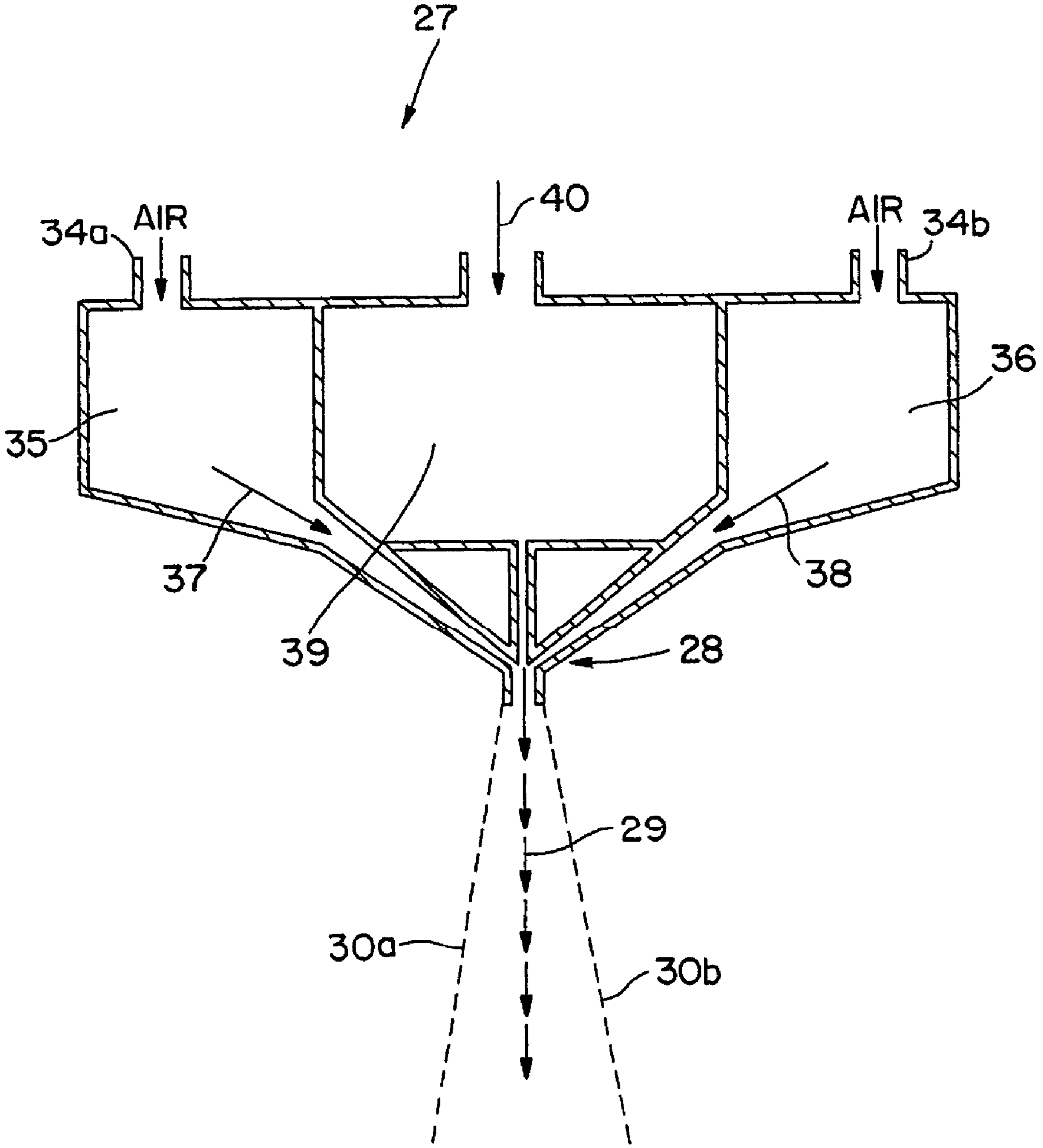
FIG. 2 is a side view of one embodiment of a meltblown die that may be used in accordance with the present invention.

In FIG. 2, a more detailed view of the meltblown die 27 is shown in which air intake 34*a-b* brings air into the meltblown die 27. Air travels into air duct 35 and air duct 36, respectively, from air intake 34*a* and 34*b*. The air proceeds along air pathway 37 and air pathway 38, respectively, to a point near the center of die tip 28 at which the air is combined with a viscous composition entering the meltblown die from a port 40. The composition contains the desired polysiloxane softeners and beneficial agents that emerges from a reservoir 39 to die tip 28. Then, the composition travels downward as viscous composition stream 29, shielded by air curtain 30*a-b*.

Figure 3:
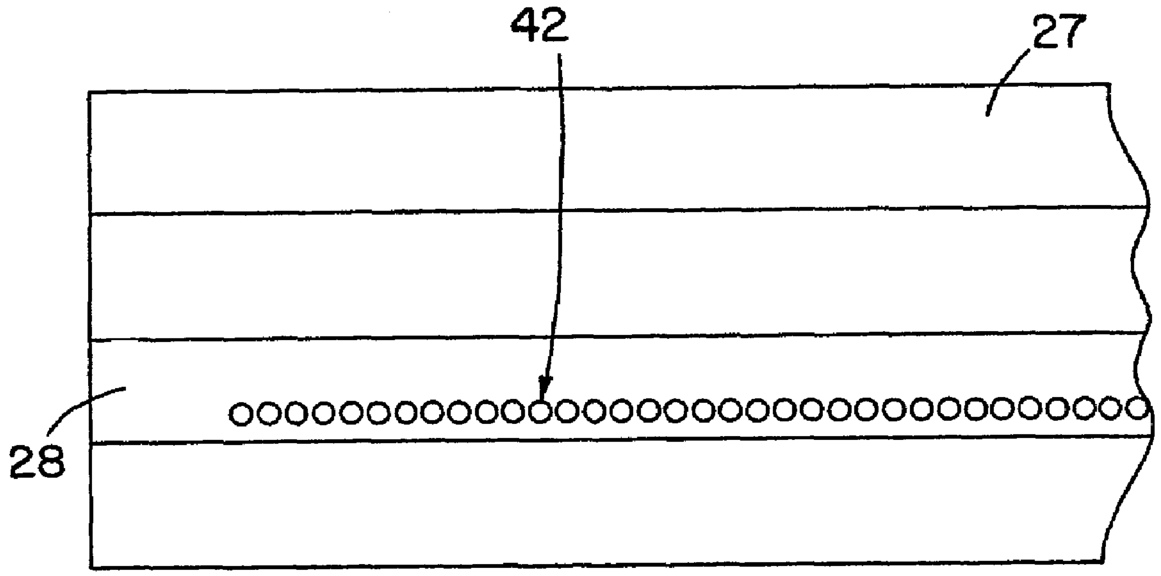
FIG. 3 is a bottom view of a portion of the meltblown die illustrated in FIG. 2 showing, in this embodiment, a row of orifices through which compositions are extruded.

FIG. 3 shows a bottom view of the meltblown die 27 as it would appear looking upwards from the tissue web 21 (as shown in FIG. 1) along the path of the composition stream 29 to the point at which it emerges from die tip 28. In one embodiment, the meltblown die 27 is comprised of orifices 42 (several of which are shown in FIG. 3), and such orifices 42 may be provided in a single row as shown in FIG. 3. In other embodiments, there could be only a few scattered orifices 42; or perhaps, instead, a number of rows or even a series of channels could be used to release the composition stream 29 from meltblown die 27. In some cases, a combination of channels and orifices 42 could be used. In other cases, multiple rows of openings could be provided, and there is no limit to the different geometrical arrangement and patterns that could be provided to the meltblown die 27 for extruding a composition stream 29 within the scope of the invention.

In one specific embodiment of the invention, a pressurized tank (not shown) transfers a gas, such as air, to the meltblown die 27 for forcing the composition through the die tip. Alternatively, a pump, such as a gear pump, may use hydraulic pressure to push the composition through the meltblown die 27. The composition is forced through the meltblown die 27 and extruded through, for instance, holes or orifices spaced along the length of the die tip. In general, the size of the orifices and the amount of the orifices located on the meltblown die tip may vary depending upon the particular application.

For example, the orifices may have a diameter from about 5 mils to about 25 mils, and particularly from about 5 mils to about 10 mils. The orifices may be spaced along the die tip in an amount from about 3 orifices per inch to about 50 orifices per inch, and particularly from about 3 orifices per inch to about 20 orifices per inch.

Two streams of pressurized air converge on either side of the composition stream 29 after it exits the meltblown die 27. The resulting air pattern disrupts the laminar flow of the composition stream 29 and attenuates the fibers being formed as they are directed onto the surface of the web. Different sized orifices or nozzles will produce fibers having a different diameter.

In general, the fibers that may be formed according to the present invention include discontinuous fibers and continuous fibers. The fibers may have various diameters depending upon the particular application. For instance, the diameter of the fibers may vary from about 5 microns to about 300 microns, such as from about 5 microns to about 200 microns or to about 100 microns. In one embodiment, continuous fibers are formed having a diameter of about 25 microns.

Figure 5:
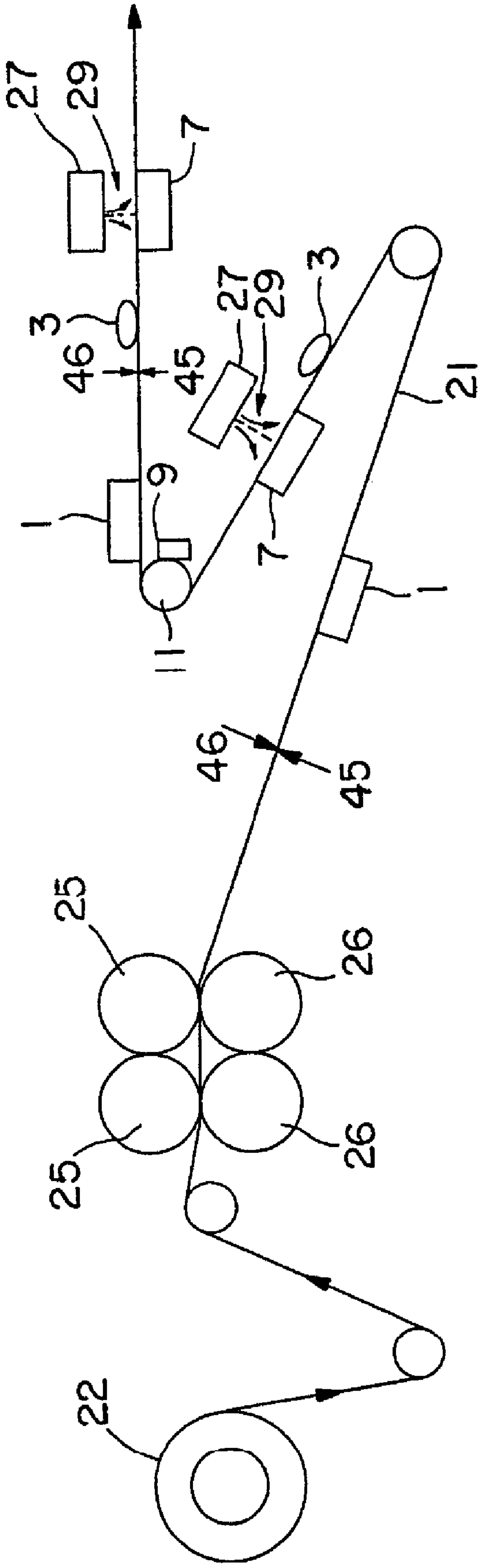
FIG. 5 illustrates one embodiment of the process of the present invention.

One embodiment of the process of the present invention is illustrated in FIG. 5. In this particular embodiment, the composition may be applied to both surfaces 45, 46 of a web 21 in a post treatment process. For example, the web 21 may be unwound from a roll 22. In this embodiment, the web is calendered using calender rolls 25 and 26 prior to application of the composition. After being calendered, the web surface 45 which will be accepting the composition may be cleaned of loose fibers and lint by sheet cleaner 1 prior to application of the composition.

The compositions which may be applied to the surface of the web according to the present invention, whether neat compositions or mixtures, tend to be not only viscous, but also somewhat tacky prior to application on the web. For example, one embodiment of the present invention contemplates application of a very high viscosity neat polysiloxane composition, which is also quite tacky when not applied to the tissue web. In addition, tissue webs tend to carry a great deal of particulate matter, with a lot of lint and loose fibers associated with the base sheet. The combination of the tacky composition and the particulates associated with the tissue web at the meltblown die may cause the die tips to become clogged and block the composition flow to the web. As such, the process and system of the present invention may prevent contact between particulate matter associated with the tissue web and the die tips of the meltblown die and may therefore avoid the expense of down time of production due to clogged die tips.

Cleaning the surface of the web prior to application of the composition, such as at sheet cleaner 1, may prevent build up of lint and fibers at the die tips of the meltblown die 27. In the embodiment illustrated in FIG. 5, sheet cleaner 1 may be, for example, a vacuum system which may remove lint and loose fibers from the surface 45 of web 21 prior to application of the composition 29.

After the surface 45 of web 21 has been cleaned at sheet cleaner 1, a composition comprising the polysiloxane softener and, in one embodiment, the beneficial agent may be applied to the surface 45 of the web. In the illustrated embodiment, the composition may be applied by use of a meltblown die 27 which may extrude the composition stream and direct it to the surface of web 21. In an alternative embodiment, the different chemical additives may be applied to the surface of the web in separate steps, such as, for instance, with a series of meltblown dies, each extruding a different substance onto the surface of the web such that multiple layers of additive are built onto the web, wherein different layers comprise different additive compositions.

In order to further protect the die tips of the meltblown die 27 from build up of lint and loose fibers, the web 21 may pass through a boundary air blocking device 3 prior to reaching the meltblown die 27. A boundary air blocking device may be, for example, a stationary blocking device or a rotary blocking device which may deflect the flow of boundary air which may travel with the web and may carry lint and fiber which may clog the meltblown die tips.

The composition may be applied to the web 21 by use of meltblown die 27. In the embodiment wherein a meltblown die is used to extrude the composition onto the surface of the web, it has been discovered that the distance between the die tips and the web surface may be important not only for obtaining the desired coating pattern, but also for keeping lint and dust away from the die tips in order to prevent blockage of the composition flow. For instance, the die tips may be between about 0.5 inch and about 3 inches from the web surface 45 as the composition is applied to the web. In one embodiment, the die tips may be between about 1 inch and about 2 inches from the surface of the web during the application process.

The system of the present invention may also include a vacuum box 7. The vacuum box 7 is provided to improve air flow and to employ a pneumatic force to pull the composition stream 29 down on to the first side 45 of the tissue web 21.

Figure 6:
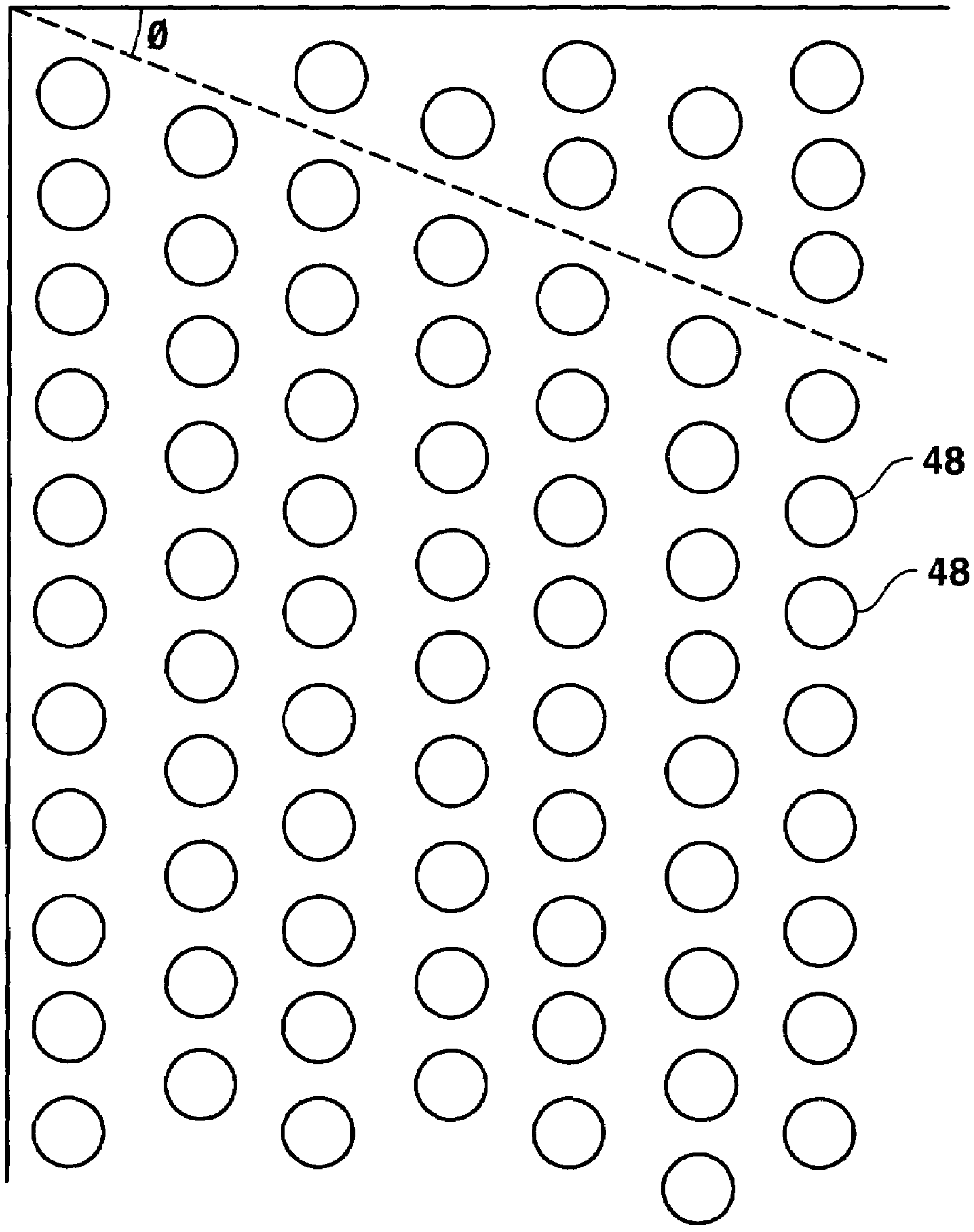
FIG. 6 is a top view of air intakes on a vacuum box which may be used in accordance with the present invention.

FIG. 6 shows a top view of the vacuum box 7 as it would appear looking down from the meltblown die 27 (as shown in FIG. 5). In this embodiment, the vacuum box 7 includes multiple air intakes 48 (several of which are shown in FIG. 6). As may be seen, the air intakes 48 are provided in a number of offset rows. In other embodiments, the air intakes 48 could be laid out with a different geometry, for instance a single row or even a series of channels to provide an air flow pulling the composition stream 29 from meltblown die 27 to the surface 45 of the web 21. In some cases, a combination of channels and air intakes 48 could be used. There is no limit to the patterns that could be provided to the air intakes 48 of the vacuum box 7 for providing the desired air flow.

In the embodiment illustrated in FIG. 6, multiple air intakes 48 are in the top of the vacuum box 7 in offset rows which are at an angle θ to the machine direction of the system. For example, the rows may be at an angle θ of between about 5° and about 30°. In one embodiment, the rows of air intakes 48 may be set at an angle from the machine direction of about 15°.

Air intakes 48 may have a diameter which may depend, among other factors, on the web speed of the system. For example, at a web speed of between about 1,000 and about 3,000 feet/minute air intakes 48 may have a diameter of between about ¼ inch and about 1 inch. In one embodiment, air intakes 48 may have a diameter of between about one-half inch and about five-eighths of an inch.

Generally, suitable vacuum pressure may be placed on the web when the angled rows of air intakes 48 comprise between about 3 and about 30 individual intakes per row of 10-inch width. In one embodiment, the rows may comprise between about 6 and about 15 individual air intakes per row of 20-inch width. For instance, a single row may include 10 individual air intakes 48.

After the composition has been applied to the surface 45 of the web 21, the web may be guided around a roll 11 to be properly aligned for application of the composition to the second surface 46 of the web 21. In guiding the web 21 around the roll 11, the surface 45 which now carries fibers of the composition 29 will contact the roll 11. Some of the composition may stick to the roll 11 as the web 21 is guided around roll 11. In order to prevent build up of the composition on the surface of the guide roll 11, roll 11 may be cleaned with a roll cleaner 9. For example, a roll cleaner such as an oscillating brush, a doctor blade, or a vacuum device may be used to prevent build up of composition 29 on guide roll 11.

The second side or surface 46 of web 21 may then be applied with the same or a different polysiloxane composition in a process similar to that used to apply the composition 29 to the first surface 45 of the web 21. As shown, the second surface of the web 46 may have excess lint and fibers removed at sheet cleaner 1 before having the composition 29 applied to the surface 46 of the web 21 with meltblown die 27. The melt blown die tips may be protected from blockage due to lint and fibers carried in the air boundary with air boundary blocking device 3. Vacuum box 7 may provide desired air flow and help direct the deposit of the composition fibers on the surface 46 of the web 21.

Figure 7:
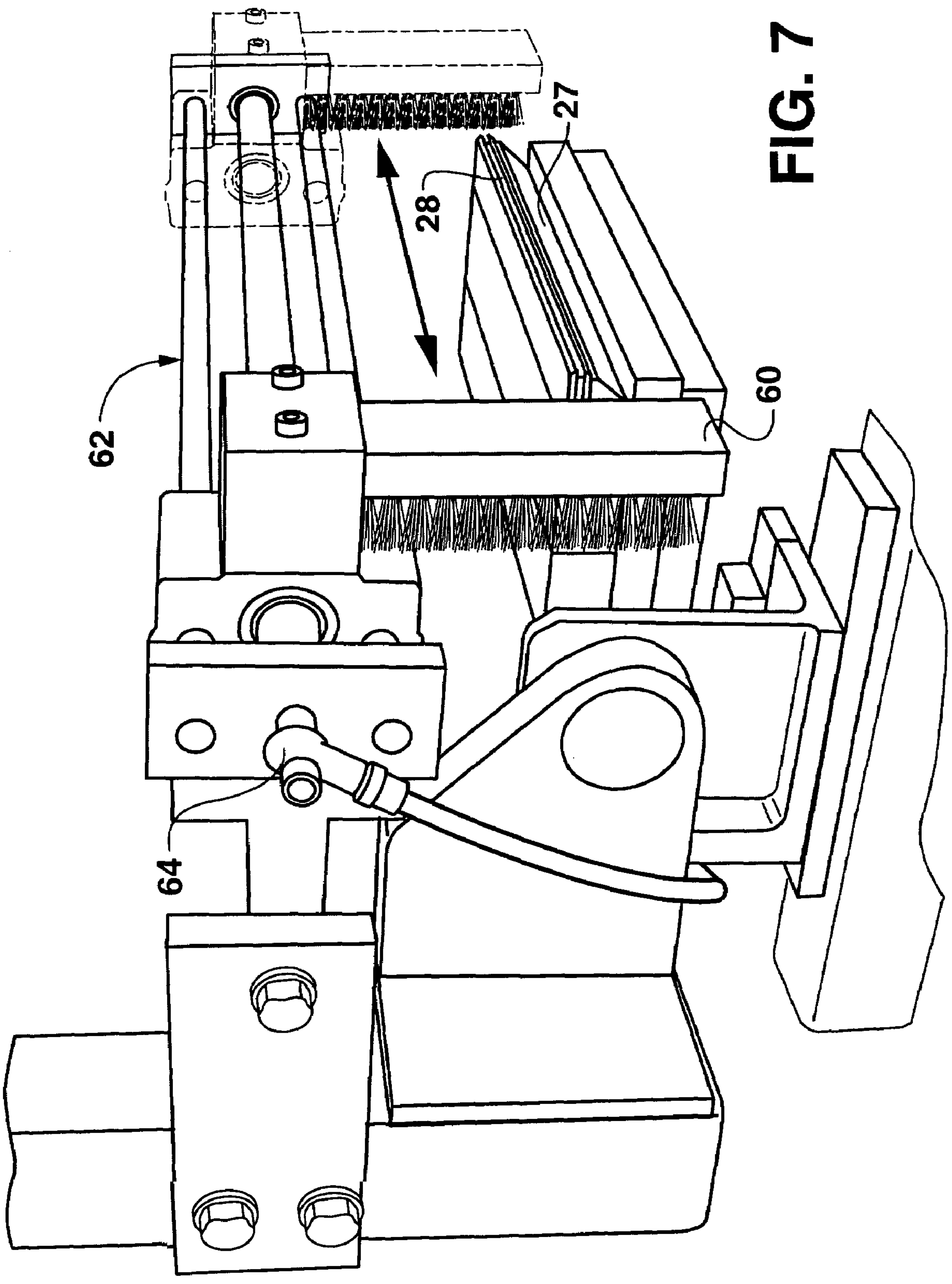
FIG. 7 is a perspective view of one embodiment of a cleaning device for cleaning a meltblown die in accordance with the present invention.

As described above, the sheet cleaner 1 and the boundary air blocking device 3 are intended to protect the orifices of the meltblown die 27 from buildup of lint and loose fibers. In one embodiment, however, the system of the present invention can include some type of cleaning device for actively cleaning the extruder or chemical additive applicator at selected times. In this regard, one embodiment of a cleaning device is shown in FIG. 7.

In this embodiment, for instance, the cleaning device includes a brush 60 that traverses across the die tip 28 of the extruder 27. The brush 60 includes a plurality of bristles that are intended to clean the orifices present on the extruder 27.

The brush 60 is mounted on a track 62 which can be, for instance, a rodless air cylinder. When using a rodless air cylinder, for instance, the track 62 may be in communication with an air source 64. In general, however, any suitable mechanism or device may be used in order to traverse the brush 60 across the extruder 27. For example, in other embodiments, pulleys, belts or chains may also be used.

The bristles contained on the brush 60 may be made from any suitable material. The bristles can be made, for instance, from nylon or wool.

By periodically traversing across the die tip 28 of the extruder 27, the brush 60 cleans the orifices through which the chemical additive is emitted. For example, the brush may remove lint, fibers and other debris that may accumulate and tend to block or clog the orifices.

Figure 8:
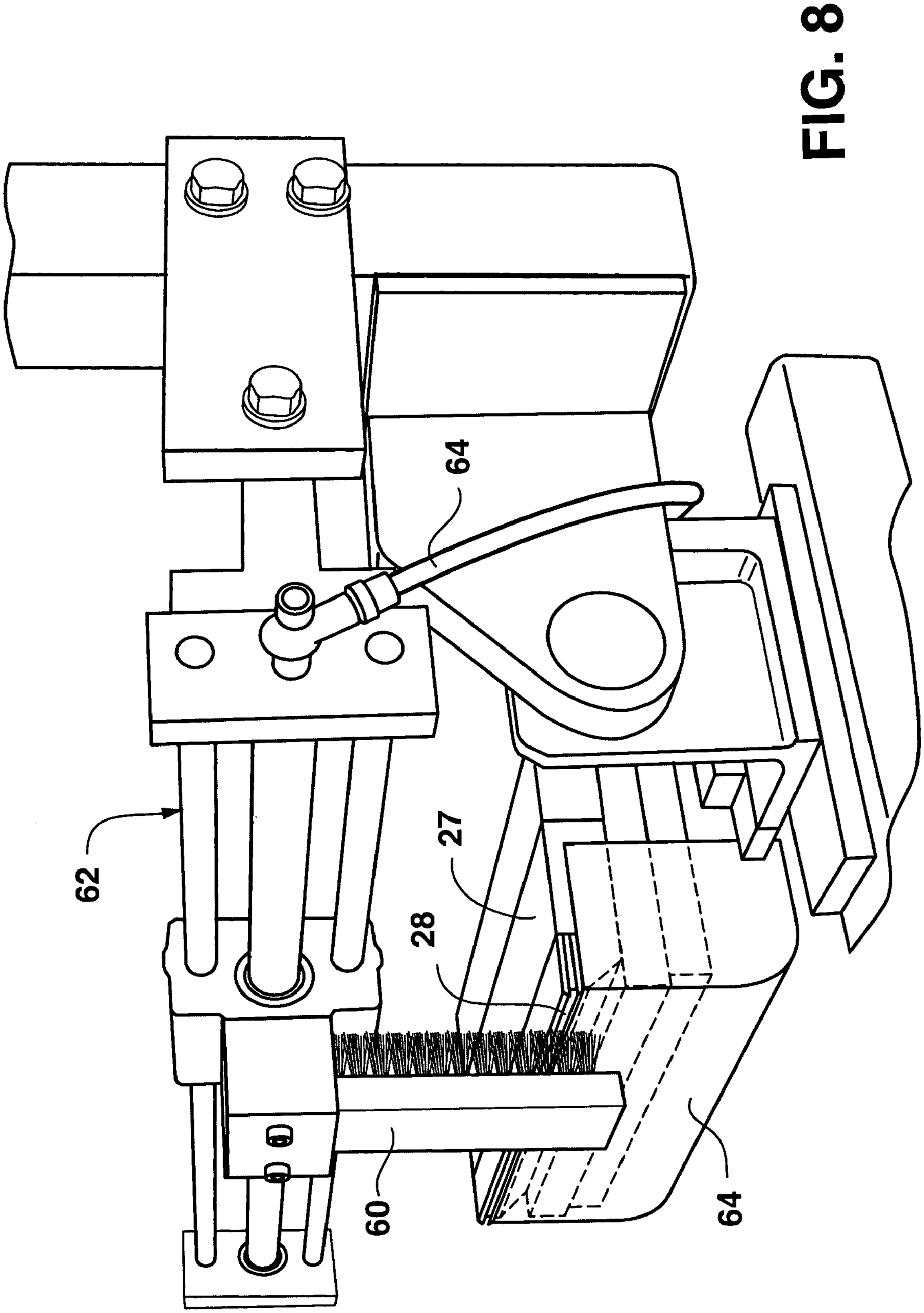
FIG. 8 is another perspective view of the cleaning device shown in FIG. 7 including a shield member or housing covering a portion of the meltblown die.

Referring to FIG. 8, another embodiment of a cleaning device made in accordance with the present invention is shown. In this embodiment, the cleaning device is substantially similar to the cleaning device shown in FIG. 7. In this embodiment, however, a shield member 64 is shown encircling or covering a substantial portion of the extruder 27. The shield member 64 prevents dust and debris from accumulating and building up in the crevices and other irregular structures that may exist on the extruder 27. Further, the present inventors have discovered that the shield member creates a different dust buildup distribution pattern. Of particular advantage, the shield member keeps a significant portion of the dust and debris away from the orifices. The shield member 64 further serves as a smooth running surface for the brush 60.

Figure 9:
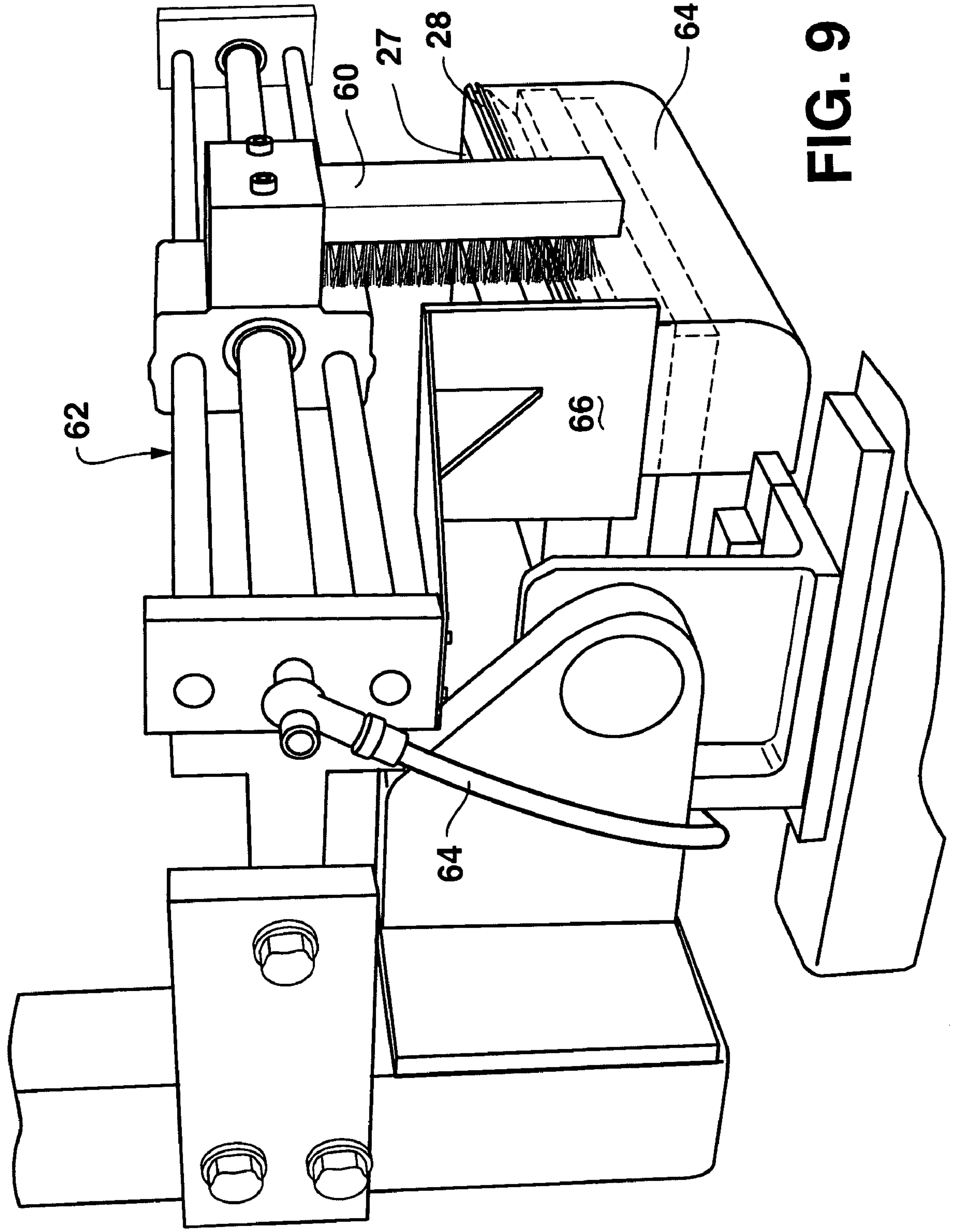
FIG. 9 is a perspective view of the cleaning device shown in FIG. 7 further including a scraping device for cleaning a brush that traverses across the meltblown die.

Referring to FIG. 9, another embodiment of a cleaning device made in accordance with the present invention is shown. In this embodiment, the cleaning device further includes a scraping device 66 which is located within the path of travel of the brush 60 but outside the field of view of the die tip 28 of the extruder 27. The scraping device 66 is intended to clean the bristles of the brush 60 when the brush is traversed across the scraping device. In particular, the scraping device 66 includes a flat edge that contacts the bristles and removes debris.

In addition to the scraping device 66, the system of the present invention can also include other means for cleaning the brush 60. For example, in one embodiment, a cleaning solvent may be applied to the brush 60 at selected times for further facilitating removal of debris and any chemical additive that may have transferred to the bristles of the brush.

In one embodiment, the cleaning solvent may not only be used to clean the brush, but can also be used for cleaning the die head itself. For instance, a cleaning solvent may be chosen that is well suited to removing any residual chemical additive present on the die head. The cleaning solvent may be applied to the brush and/or to the die head using any suitable method. For instance, the cleaning solvent may be applied to the die head and/or the brush using, for instance, a spray device. Alternatively, the brush may be contacted with some type of cleaning fluid reservoir, such as a sponge, that transfers the cleaning fluid to the brush.

In general, any suitable cleaning fluid may be used in the present invention. In general, the cleaning fluid chosen will depend upon the particular chemical additive being emitted by the extruder 27. Examples of cleaning fluids include aqueous solutions of detergents and organic solvents. Particular organic solvents that may be used include ethanol, propanol, acetone, ethyl acetate, n-methyl pyrrolidinone, 2-pyrrolidinone, butyrolactone, tetrahydrofuran, 2-methoxyethyl ether, toluene, and the like.

Figure 10:
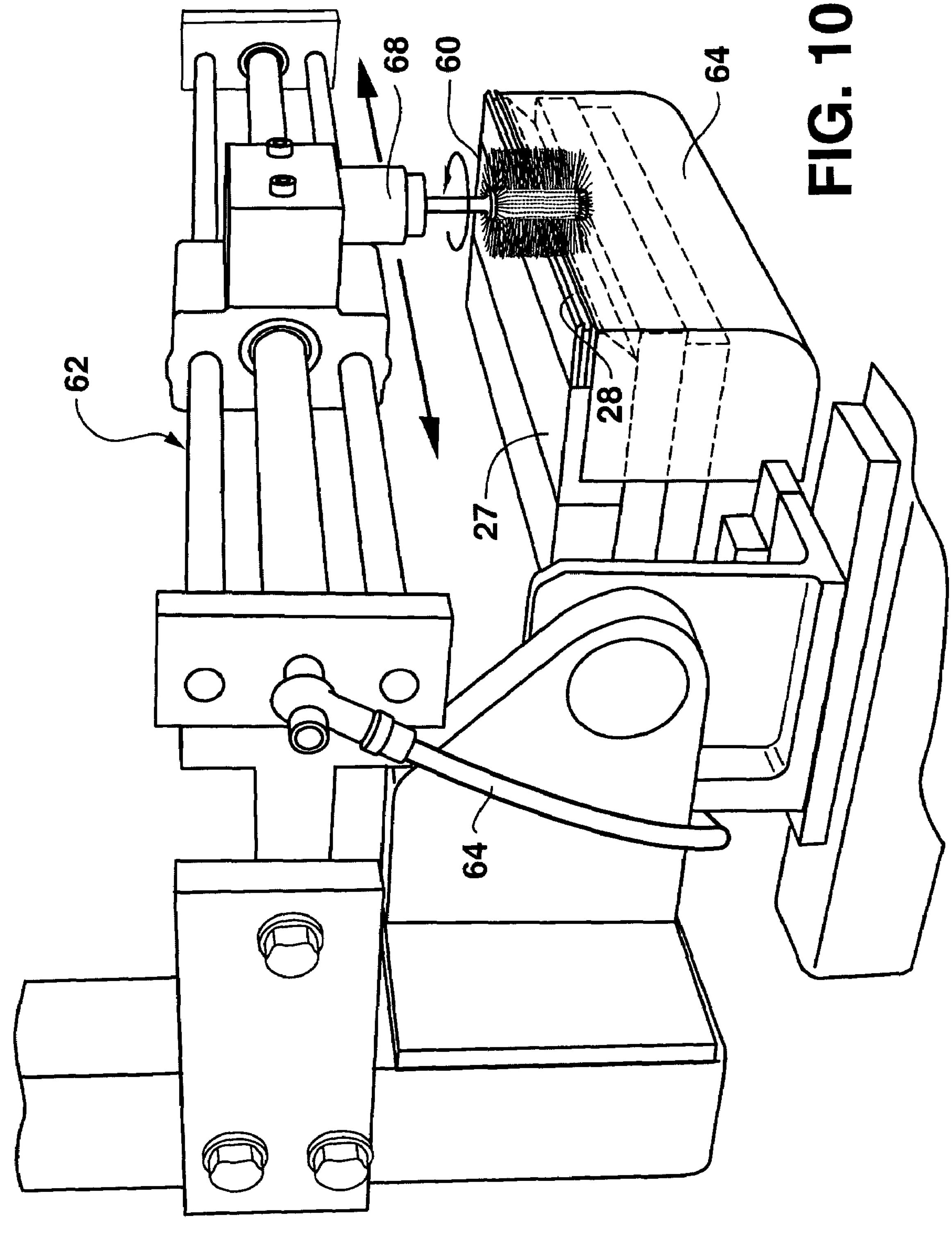
FIG. 10 is a perspective view of another embodiment of a cleaning device that may be used in accordance with the present invention.

Referring to FIG. 10, another embodiment of a cleaning device made in accordance with the present invention is shown. In this embodiment, the brush 60 rotates as it traverses across the extruder 27. As shown, the brush 60 includes bristles that extend around the entire circumference of the brush. The brush is connected to a motor 68 that causes the brush to rotate. Although the brush is shown rotating in a counterclockwise direction, it should be understood that the brush can also rotate in a clockwise direction.

Figure 11:
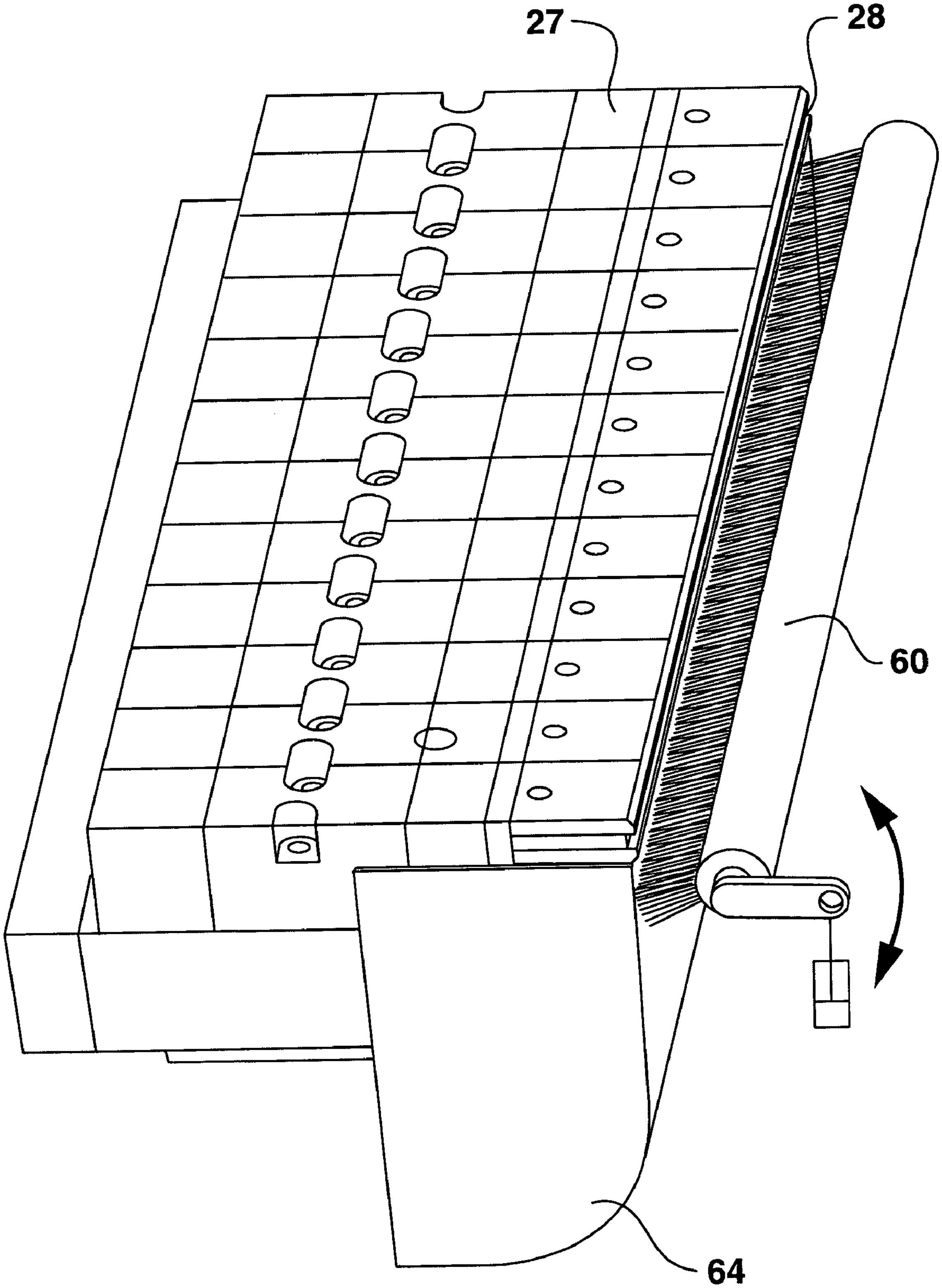
FIG. 11 is a perspective view of still another embodiment of a cleaning device that may be used in accordance with the present invention.

Referring to FIG. 11, still another embodiment of a cleaning device made in accordance with the present invention is shown. In this embodiment, the brush 60 extends substantially the entire length of the die tip 28. In this embodiment, instead of traversing across the die tip in a horizontal motion, the brush traverses across the die tip in a vertical motion. In particular, the brush 60 includes a rotatable cylindrical core connected to a plurality of bristles that contact the die tip 28. In one embodiment, the bristles may completely encircle the cylindrical core as shown in FIG. 11. In this embodiment, the brush 60 may rotate continuously in a single direction, such as in a clockwise direction or in a counterclockwise direction.

In this embodiment, when the brush 60 is not cleaning the orifices of the extruder 27, the brush may be moved or otherwise pivoted from a cleaning position to a disengagement position. In the disengagement position, the brush is moved or otherwise pivoted outside the field of view of the die tip 28.

In the embodiment shown in FIG. 11, alternatively, the brush 60 may still move in a horizontal motion depending upon the motor used and the mechanical linkage configured between the brush and the motor. In this embodiment, for instance, the brush may be somewhat shorter than the width of the die tip 28. For example, the brush may have a width that is about 80% of the width of the die tip. It should be understood, however, that in this embodiment the brush may have the same length as the die tip or may even be longer.

Instead of or in addition to using a brush 60 as shown in FIGS. 7-11, the system of the present invention may also use fluid nozzles or a vacuum source in order to clean the orifices of the extruder 27. For example, referring to FIG. 12, the die tip 28 of the extruder 27 is shown positioned adjacent to a plurality of fluid jet nozzles 72. The fluid jet nozzles 72 are positioned across a common conduit 70 that is in turn connected to a pressurized fluid source. The conduit can be, for instance, a pipe having a diameter of about 1" or less.

The fluid that is emitted from the nozzles 72 may be either a liquid or a gas. The liquid may be, for instance, water or a cleaning solution. In an alternative embodiment, a high pressure gas, such as air, may be emitted from the nozzles 72 for cleaning the orifices of the die tip 28. As stated above, the nozzles 72 may be used in addition to the brush 60 as shown in the previous figures.

Figure 13:
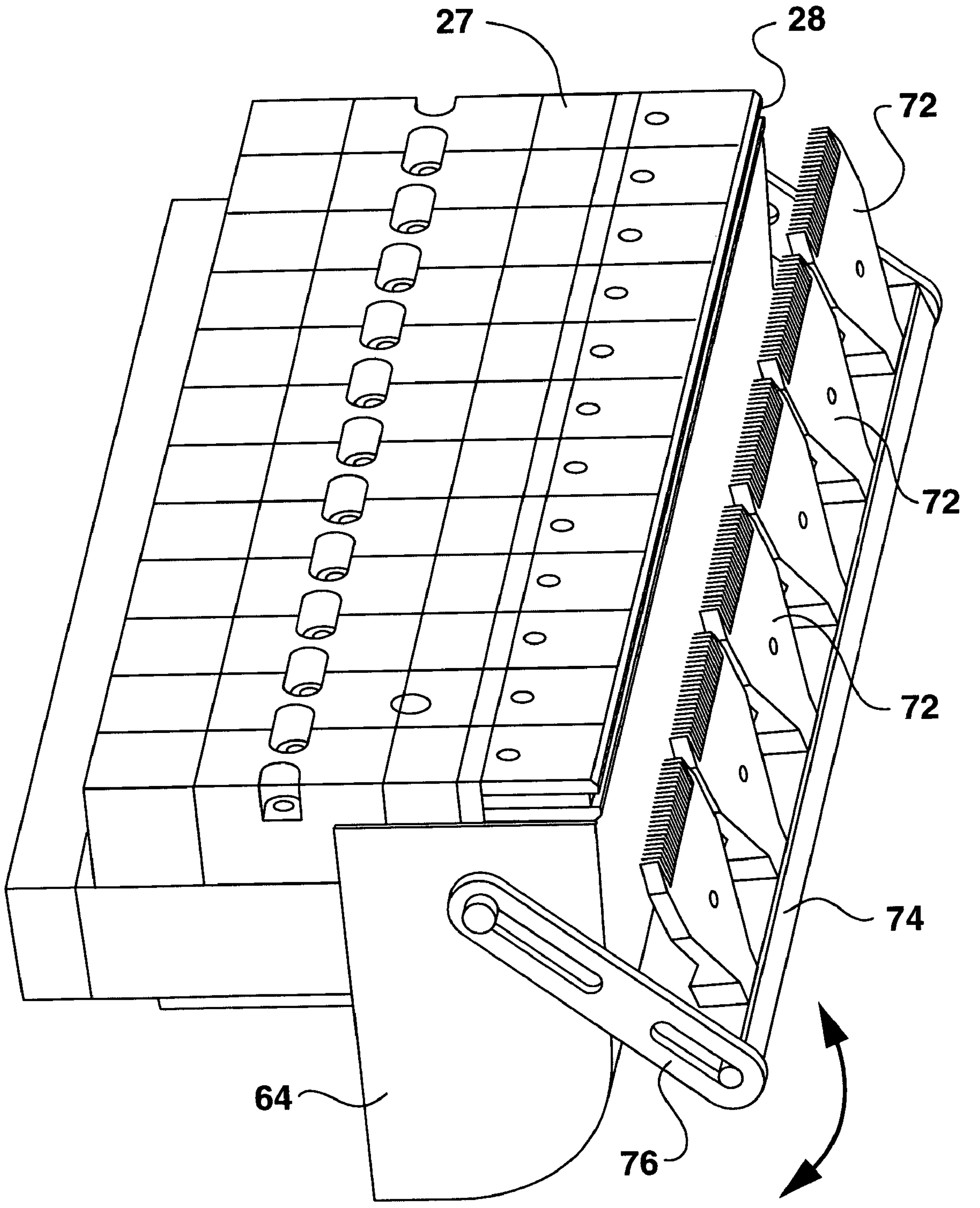
FIG. 13 is a perspective view of an alternative embodiment of a fluid or vacuum nozzle that may be used to clean the meltblown die.

Referring to FIG. 13, another embodiment of a cleaning device made in accordance with the present invention incorporating a plurality of fluid jet nozzles 72 is shown. In this embodiment, the fluid nozzles 72 may be independently controlled or, alternatively, may be connected to a common manifold. As shown, the fluid nozzles 72 are mounted on a beam 74 connected to a linking structure 76. The linking structure allows the nozzles 72 to be rotated from an engagement position for cleaning the die tip 28 of the extruder 27 to a nonengagement position in which the nozzles are rotated out of the field of view of the orifices on the die tip.

Figure 12:
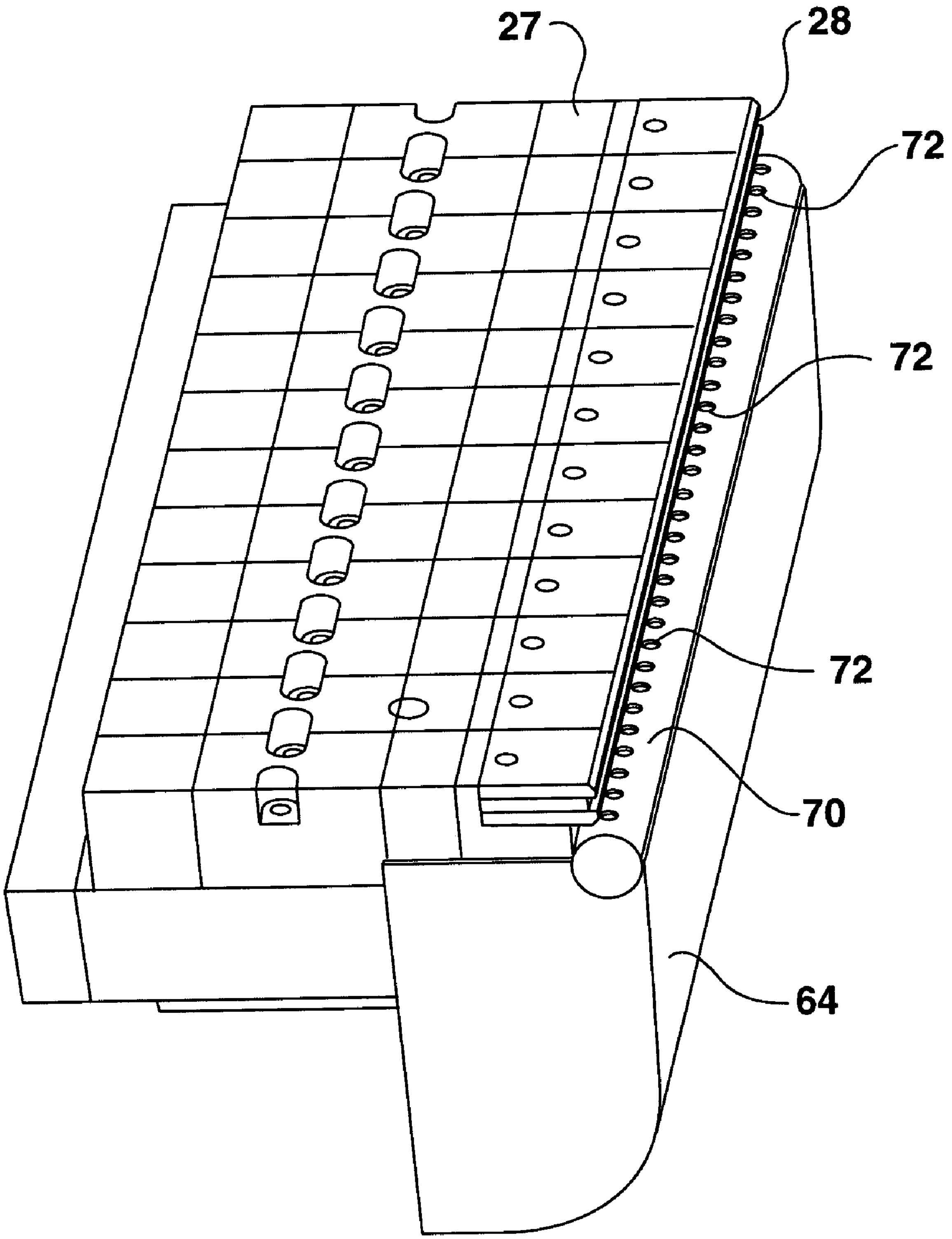
FIG. 12 is a perspective view of one embodiment of a plurality of fluid nozzles positioned adjacent to a row of orifices on a meltblown die for periodically cleaning the die tip.
Figure 14:
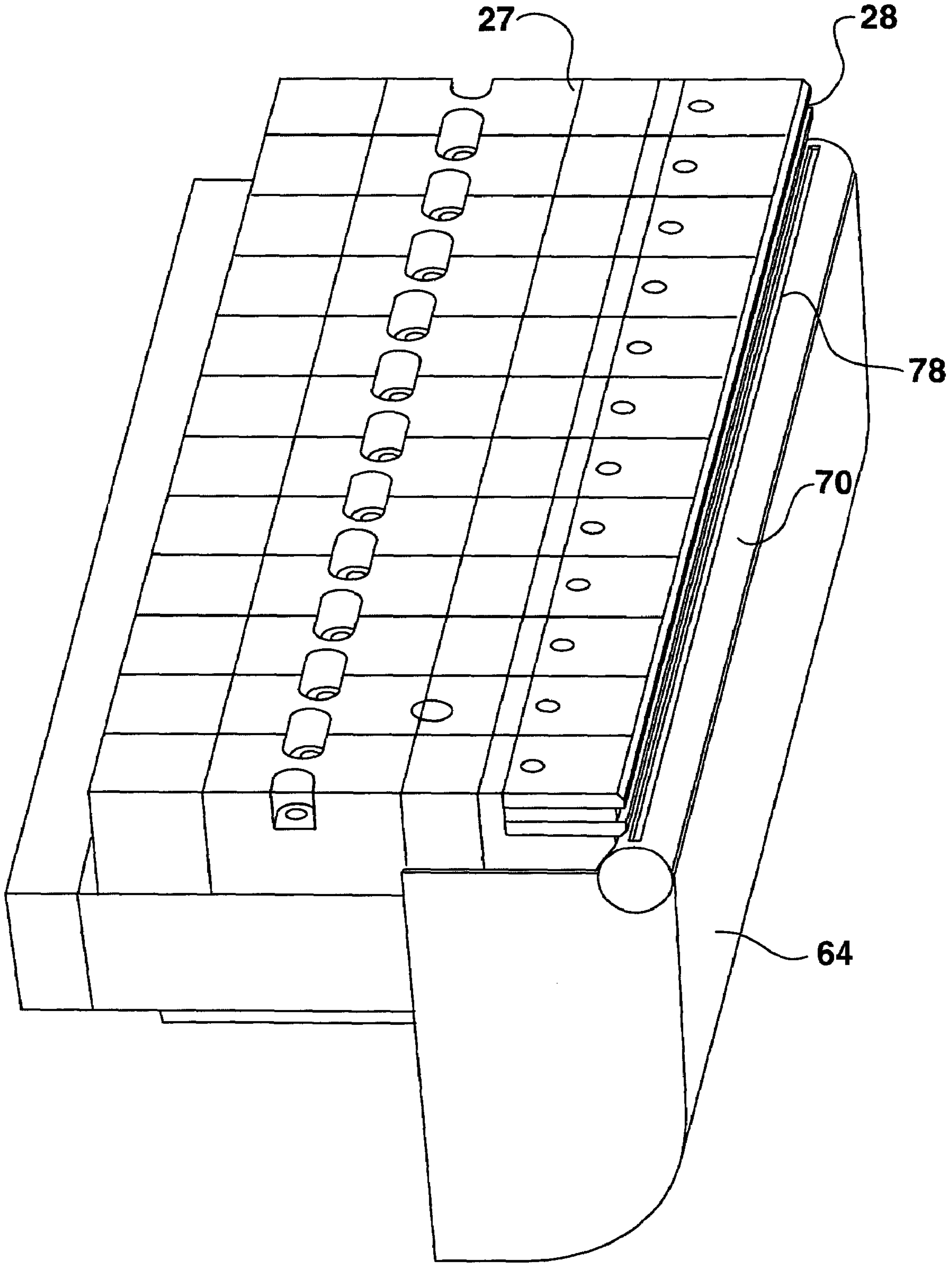
FIG. 14 is a perspective view of another embodiment of a meltblown die shown in combination with a cleaning device for the orifices located on the meltblown die.

Referring to FIG. 14, a cleaning device similar to the one illustrated in FIG. 12 is shown. In this embodiment, however, the conduit 70 includes a single slit 78 instead of containing a plurality of nozzles 72.

In one embodiment, instead of emitting a fluid from the slit 78, the slit 78 may be connected to a vacuum source for creating a suction force across the slit. In this manner, fibers, lint and debris may be sucked into the conduit 70 and collected in a filter instead of being blown off the die tip 28. It should be understood, that individual suction chambers may also be connected to a vacuum source as described above. Further, in still other embodiments, fluid jet nozzles may be used in conjunction with a vacuum source for cleaning the die tip.

Figure 15:
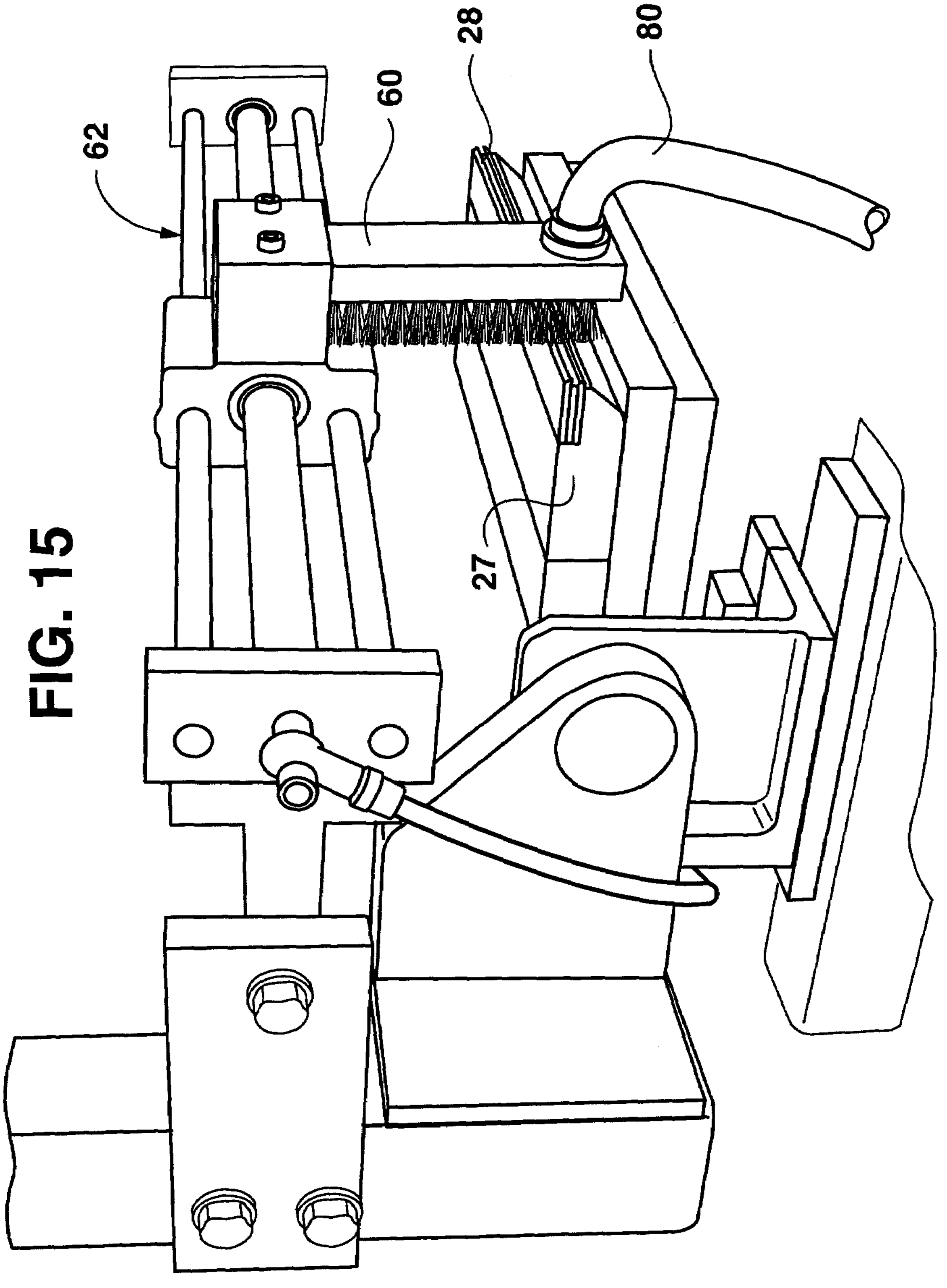
FIG. 15 is a perspective view of still another embodiment of a cleaning device for use in the present invention.

Referring now to FIG. 15, another embodiment of a cleaning device that may be used in accordance with the present invention is shown. In this embodiment, a brush 60 is shown that traverses across the die tip 28 of the meltblown die 27. In this embodiment, however, the brush is placed in communication with a fluid channel 80. Not shown, below the bristles of the brush 60, the brush may include at least one nozzle in communication with the fluid channel 80. The fluid channel 80 can then be used to deliver a flow of liquid or gas through the nozzles or can be used to deliver a suction force to the brush 60. Thus, the brush 60 may be used in conjunction with fluid jet nozzles and/or vacuum nozzles for assisting in cleaning the extruder 27.

In addition to using any of the cleaning devices described above, in one embodiment, the extruder 27 may also be electrically grounded. Grounding the extruder and supporting equipment may neutralize charged surfaces on the chemical additive applicator and minimize the tendency of fibers, lint and other debris from collecting on the orifices contained on the extruder.

Referring again to FIG. 2, the flow rate of the composition through the die 27 may be, for instance, from about 2 grams/inch to about 9 grams/inch in one embodiment. The flow rate will depend, however, on the composition being applied to the tissue web, on the speed of the moving tissue web, and on various other factors. In general, the total add on rate of the composition (including add on to both sides of the web if both sides are treated) may be up to about 10% based upon the weight of the tissue web.

The polysiloxane softeners may be added to the web at a total add on rate of from about 0.05% to about 5% by weight of the tissue web. For example, in one embodiment, a softener may be present in the tissue sheet in an amount of from about 0.1% to about 3% by weight.

In addition to the polysiloxane softener, the products of the present invention may also optionally include one or more beneficial agents. The beneficial agents may be added to the web at a total add on rate of from about 0% to about 1% by weight of the tissue web. As with the softeners, the beneficial agents may be mixed together and/or with the softeners for combined application, or applied separately, as desired.

In one embodiment, a single composition may be applied which comprises a combination of one or more polysiloxane softening agents and one or more beneficial agents. For instance, a single composition may be prepared including a polysiloxane softener, Aloe Vera extract and Vitamin E. In one embodiment, the composition may be added to the web at an add on rate for the polysiloxane of between about 0.1% and about 1% by weight of the web, an add on rates for the Aloe of between about 0.01% and about 1% by weight of the web, and an add on rate for the vitamin E of between about 0.01% and about 1% by weight of the web.

In one embodiment, a single composition may be applied which comprises from about 0% to about 30% by weight of the beneficial agents and from about 70% to about 100% by weight of one or more polysiloxane softeners. In one embodiment, the composition may include only the softeners and the beneficial agents, with no other additives.

The product web may have the polysiloxane softeners and the beneficial agents applied to the surface of the web in a variety of different layered arrangements and combinations. For example, all of the desired topical applications may be premixed and applied to the surface of the web at once, such that all of the fibrous additive on one side of the web is essentially the same and contains both the desired polysiloxanes and the desired beneficial agents. Alternatively, the different agents may be applied in separate steps, creating layers of fibers on the surface of the web, each layer comprising different additives. In addition, some of the additives, for example two different beneficial agents, may be pre-mixed and applied to the web surface together, while the other desired additives may be applied in one or more separate steps and form separate layers of fibers on the web either above or below the others, as desired. Any possible combination of additives is envisioned according to the present invention.

Once applied to a tissue web, the composition may cover almost all or only a small portion of the surface area of the web depending upon the particular application. In general, the composition may cover from about 0.5% to about 99% of the surface area. In one embodiment, for example, the composition may cover from about 0.5% to about 5% of the surface area of the web. In an alternative embodiment, however, the composition may cover from about 20% to about 60% of the surface area of the web.

The viscosity of the composition may also vary depending upon the particular circumstances. When it is desired to produce fibers through the meltblown die, the viscosity of the composition should be relatively high. For instance, the viscosity of the composition may be at least 1000 cps, particularly greater than about 2000 cps, and more particularly greater than about 3000 cps. For example, the viscosity of the composition may be from about 1000 to over 100,000 cps, such as from about 1000 cps to about 50,000 cps and particularly from about 2000 to about 10,000 cps.

As stated above, the purpose for air pressure or air curtain 30*a-b* on either side of the composition stream 29 (in selected embodiments of the invention) is to assist in the formation of fibers, to attenuate the fibers, and to direct the fibers onto the tissue web. Various air pressures may be used.

The temperature of the composition as it is applied to a tissue web in accordance with the present invention may vary depending upon the particular application. For instance, in some applications, the composition may be applied at ambient temperatures. In other applications, however, the composition may be heated prior to or during extrusion. The composition may be heated, for instance, in order to adjust the viscosity of the composition. The composition may be heated by a pre-heater prior to entering the meltblown die or, alternatively, may be heated within the meltblown die itself using, for instance, an electrical resistance heater.

In one embodiment, the composition containing the chemical additive may be a solid at ambient temperatures (from about 20° C. to about 23° C.). In this embodiment, the composition may be heated an amount sufficient to create a flowable liquid that may be extruded through the meltblown die. For example, the composition may be heated an amount sufficient to allow the composition to be extruded through the meltblown die and form fibers. Once formed, the fibers are then applied to a web in accordance with the present invention. The composition may resolidify upon cooling.

Examples of additives that may need to be heated prior to being deposited on a tissue web include compositions containing behenyl alcohol. Other compositions that may need to be heated include compositions that contain a wax, that contain any type of polymer that is a solid at ambient temperatures, and/or that contain a silicone.

The process of the present invention may be used to apply compositions and chemical additives to numerous and various different types of products. For most applications, however, the present invention is directed to applying chemical additives to tissue products, particularly wiping products. While the current invention is applicable to any paper sheet, the process of the present invention is particularly well suited for use in conjunction with tissue and towel products. Tissue and towel products as used herein are differentiated from other paper products in terms of their bulk. The bulk of the products of this invention is calculated as the quotient of the caliper expressed in microns, divided by the basis weight, expressed in grams per square meter. The resulting bulk is expressed as cubic centimeters per gram. Writing papers, newsprint and other such papers have higher strength, stiffness, and density (low bulk) in comparison to tissue products which tend to have much higher calipers for a given basis weight. The tissue products of the present invention have a bulk greater than 2 cc/g, more preferably greater than 2.5 cc/g and still more preferably greater than about 3 cc/g.

As noted previously one advantage of the present invention is the ability to apply viscous compositions, particularly polysiloxane compositions, without the need for water based diluents or application of Z-directional compression forces to the web during application of the chemical additive. Whenever water or Z-directional compressive forces are applied to the web the bulk of the web can be substantially reduced. As this invention avoids the need for water and Z-directional compressive forces it is particularly applicable to high bulk tissue products. Hence, in a specific embodiment of the present invention the final tissue product has a bulk of greater than about 7 cc/g, in another embodiment the final tissue product has a bulk of greater than about 8 cc/g and in still another embodiment the final tissue product has a bulk of greater than about 9 cc/g.

For the tissue sheets of the present invention, both creped and uncreped webs may be used. Uncreped tissue production is disclosed in U.S. Pat. No. 5,772,845, issued on Jun. 30, 1998 to Farrington, Jr. et al., the disclosure of which is herein incorporated by reference to the extent it is non-contradictory herewith. Creped tissue production is disclosed in U.S. Pat. No. 5,637,194, issued on Jun. 10, 1997 to Ampulski et al.; U.S. Pat. No. 4,529,480, issued on Jul. 16, 1985 to Trokhan; U.S. Pat. No. 6,103,063, issued on Aug. 15, 2000 to Oriaran et al.; and, U.S. Pat. No. 4,440,597, issued on Apr. 3, 1984 to Wells et al., the disclosures of all of which are herein incorporated by reference to the extent that they are non-contradictory herewith. Also suitable for application of the above mentioned chemical additives are tissue sheets that are pattern densified or imprinted, such as the webs disclosed in any of the following U.S. Patents: U.S. Pat. No. 4,514,345, issued on Apr. 30, 1985 to Johnson et al.; U.S. Pat. No. 4,528,239, issued on Jul. 9, 1985 to Trokhan; U.S. Pat. No. 5,098,522, issued on Mar. 24, 1992; U.S. Pat. No. 5,260,171, issued on Nov. 9, 1993 to Smurkoski et al.; U.S. Pat. No. 5,275,700, issued on Jan. 4, 1994 to Trokhan; U.S. Pat. No. 5,328,565, issued on Jul. 12, 1994 to Rasch et al.; U.S. Pat. No. 5,334,289, issued on Aug. 2, 1994 to Trokhan et al.; U.S. Pat. No. 5,431,786, issued on Jul. 11, 1995 to Rasch et al.; U.S. Pat. No. 5,496,624, issued on Mar. 5, 1996 to Steltjes, Jr. et al.; U.S. Pat. No. 5,500,277, issued on Mar. 19, 1996 to Trokhan et al.; U.S. Pat. No. 5,514,523, issued on May 7, 1996 to Trokhan et al.; U.S. Pat. No. 5,554,467, issued on Sep. 10, 1996 to Trokhan et al.; U.S. Pat. No. 5,566,724, issued on Oct. 22, 1996 to Trokhan et al.; U.S. Pat. No. 5,624,790, issued on Apr. 29, 1997 to Trokhan et al.; and, U.S. Pat. No. 5,628,876, issued on May 13, 1997 to Ayers et al., the disclosures of all of which are herein incorporated by reference to the extent that they are non-contradictory herewith. Such imprinted tissue webs may have a network of densified regions that have been imprinted against a drum dryer by an imprinting fabric, and regions that are relatively less densified (e.g., "domes" in the tissue sheet) corresponding to deflection conduits in the imprinting fabric, wherein the tissue sheet superposed over the deflection conduits is deflected by an air pressure differential across the deflection conduit to form a lower-density pillow-like region or dome in the tissue sheet.

Various drying operations may be useful in the manufacture of the tissue products of the present invention. Examples of such drying methods include, but are not limited to, drum drying, through drying, steam drying such as superheated steam drying, displacement dewatering, Yankee drying, infrared drying, microwave drying, radiofrequency drying in general, and impulse drying, as disclosed in U.S. Pat. No. 5,353,521, issued on Oct. 11, 1994 to Orloff and U.S. Pat. No. 5,598,642, issued on Feb. 4, 1997 to Orloff et al., the disclosures of both which are herein incorporated by reference to the extent that they are non-contradictory herewith. Other drying technologies may be used, such as methods employing differential gas pressure include the use of air presses as disclosed U.S. Pat. No. 6,096,169, issued on Aug. 1, 2000 to Hermans et al. and U.S. Pat. No. 6,143,135, issued on Nov. 7, 2000 to Hada et al., the disclosures of both which are herein incorporated by reference to the extent they are non-contradictory herewith. Also relevant are the paper machines disclosed in U.S. Pat. No. 5,230,776, issued on Jul. 27, 1993 to I. A. Andersson et al.

The tissue product may contain a variety of fiber types both natural and synthetic. In one embodiment the tissue product comprises hardwood and softwood fibers. The overall ratio of hardwood pulp fibers to softwood pulp fibers within the tissue product, including individual tissue sheets making up the product may vary broadly. The ratio of hardwood pulp fibers to softwood pulp fibers may range from about 9:1 to about 1:9, more specifically from about 9:1 to about 1:4, and most specifically from about 9:1 to about 1:1. In one embodiment of the present invention, the hardwood pulp fibers and softwood pulp fibers may be blended prior to forming the tissue web thereby producing a homogenous distribution of hardwood pulp fibers and softwood pulp fibers in the z-direction of the tissue web. In another embodiment of the present invention, the hardwood pulp fibers and softwood pulp fibers may be layered (stratified fiber furnish) so as to give a heterogeneous distribution of hardwood pulp fibers and softwood pulp fibers in the z-direction of the tissue web. In another embodiment, the hardwood pulp fibers may be located in at least one of the outer layers of the tissue product and/or tissue webs wherein at least one of the inner layers may comprise softwood pulp fibers. In still another embodiment the tissue product contains secondary or recycled fibers optionally containing virgin or synthetic fibers.

In addition, synthetic fibers may also be utilized in the present invention. The discussion herein regarding pulp fibers is understood to include synthetic fibers. Some suitable polymers that may be used to form the synthetic fibers include, but are not limited to: polyolefins, such as, polyethylene, polypropylene, polybutylene, and the like; polyesters, such as polyethylene terephthalate, poly(glycolic acid) (PGA), poly (lactic acid) (PLA), poly(β-malic acid) (PMLA), poly(ε-caprolactone) (PCL), poly(ρ-dioxanone) (PDS), poly(3-hydroxybutyrate) (PHB), and the like; and, polyamides, such as nylon and the like. Synthetic or natural cellulosic polymers, including but not limited to: cellulosic esters; cellulosic ethers; cellulosic nitrates; cellulosic acetates; cellulosic acetate butyrates; ethyl cellulose; regenerated celluloses, such as viscose, rayon, and the like; cotton; flax; hemp; and mixtures thereof may be used in the present invention. The synthetic fibers may be located in one or all of the layers and sheets comprising the tissue product.

The basis weight of tissue products treated in accordance with the present invention can also vary depending upon the ultimate use for the product. In general, the basis weight can range from about 6 gsm to 200 gsm and greater. For example, in one embodiment, the tissue product can have a basis weight of from about 6 gsm to about 80 gsm.

In one embodiment, a chemical additive is applied to a tissue web in accordance with the present invention while preserving the wettability and absorbency characteristics of the web. For example, many chemical additives that may be applied to tissue products are hydrophobic and thus when applied to a bath tissue across the surface of the tissue may adversely interfere with the ability of the tissue to become wet and disperse when being disposed of after use.

In accordance with one embodiment of the present invention, however, hydrophobic compositions such as aminopolysiloxanes may be applied to tissue webs and other paper products without adversely interfering with the wettability of the web. In this embodiment of the present invention, the hydrophobic composition is applied to the web in a discontinuous manner, such that the coverage of the composition is heterogeneous across the web surface. For instance, in accordance with the present invention, the hydrophobic composition may be applied across the surface of the web yet be applied to contain various voids in the coverage for permitting the web to become wet when contacted with water. For example, in one embodiment, the hydrophobic composition is applied to the web as fibers that overlap across the surface of the web but yet leave areas on the web that remain untreated. In other applications, however, it should be understood that the viscous composition may be extruded onto the web so as to cover the entire surface area.

Figure 4:
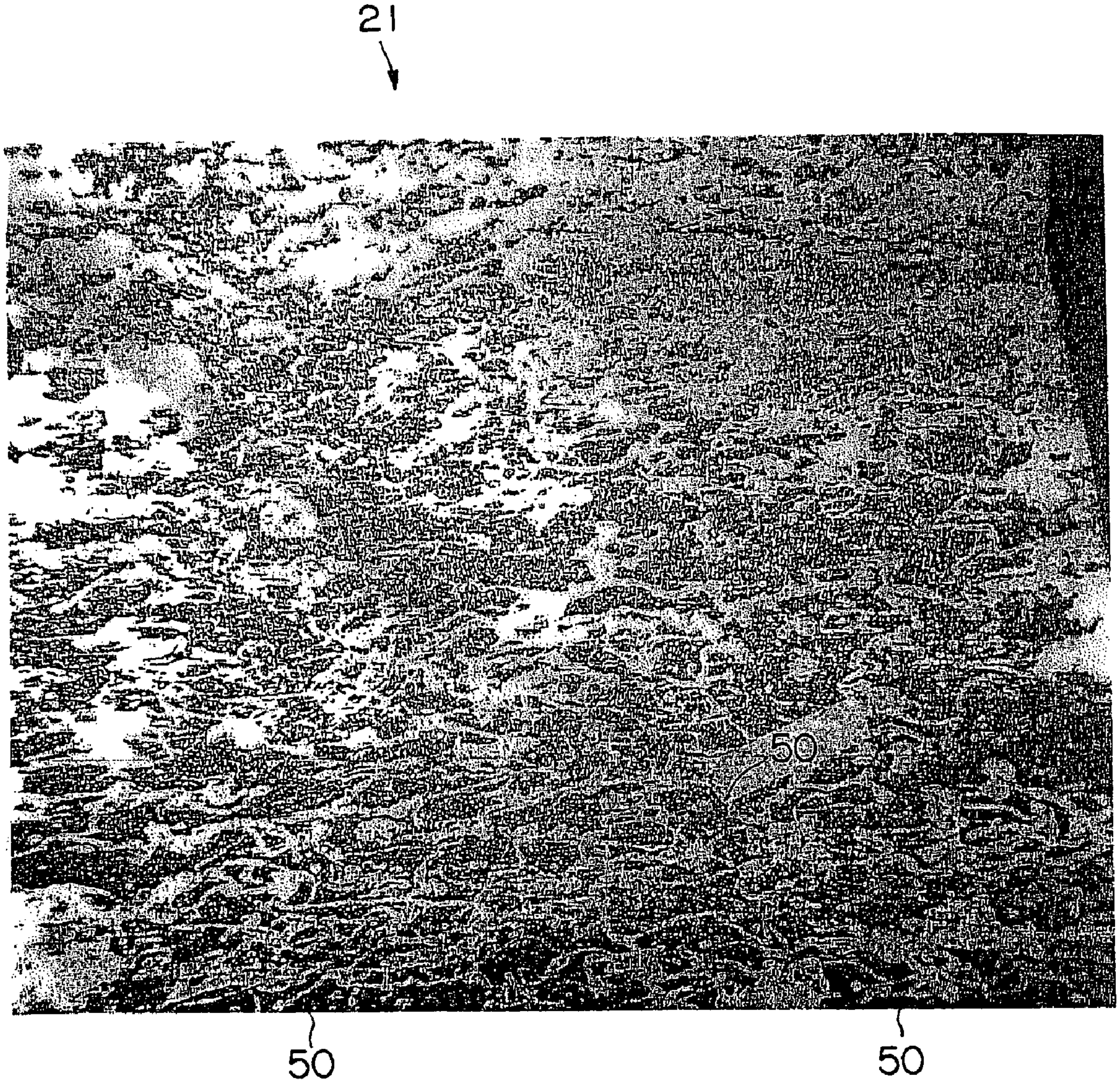
FIG. 4 is a plan view of one embodiment of a paper web made in accordance with the present invention.

Referring to FIG. 4, one embodiment of a tissue web 21 treated in accordance with the present invention is shown. In this figure, the tissue web is illustrated in a dark color to show the presence of fibers or filaments 50 appearing on the surface of the web. As shown, the filaments 50 intersect at various points and are randomly dispersed over the surface of the web, yet form a continuous network across the surface of the web. It is believed that the filaments 50 form a network on the surface of the web that increases the strength, particularly the wet strength and the geometric mean tensile strength of the web.

Geometric mean tensile strength (GMT) is the square root of the product of the machine direction tensile strength and the cross-machine direction tensile strength of the web. Tensile strength may be measured using an instron tensile tester using a 3-inch jaw width (sample width), a jaw span of 2 inches (gauge length), and a crosshead speed of 25.4 centimeters per minute after maintaining the sample under TAPPI conditions for 4 hours before testing. The product webs of the present invention may have a geometric mean tensile strength of between about 400 g per 3 inches and about 1,500 g per 3 inches.

In the embodiment shown in FIG. 4, the filaments 50 only cover a portion of the surface area of the web 21. In this regard, the composition used to form the filaments may be applied to the web so as to cover from about 20% to about 80% of the surface of the web, and particularly from about 30% to about 60% of the surface area of the web. By leaving untreated areas on the web, the web remains easily wettable. In this manner, extremely hydrophobic materials may be applied to the web for improving the properties of the web while still permitting the web to become wet in an acceptable amount of time when contacted with water and maintain a high level of absorbency.

One test that measures the wettability of a web is referred to as the "Wet Out Time" test. The Wet Out Time of tissue webs treated in accordance with the present invention may be about 180 seconds or less, and more specifically about 120 seconds or less. For instance, tissue webs treated in accordance with the present invention may have a Wet Out Time of about 60 seconds or less, still more specifically about 10 seconds or less, still more specifically from about 4 to about 8 seconds.

As used herein, "Wet Out time" is related to absorbency and is the time it takes for a given sample to completely wet out when placed in water. More specifically, the Wet Out Time is determined by cutting 20 sheets of the tissue sample into 2.5-inch squares. The number of sheets used in the test is independent of the number of plies per sheet of product. The 20 square sheets are stacked together and stapled at each corner to form a pad. The pad is held close to the surface of a constant temperature distilled water bath (23+/−2° C.), which is the appropriate size and depth to ensure the saturated specimen does not contact the bottom of the container and the top surface of the water at the same time, and dropped flat onto the water surface, staple points down. The time taken for the pad to become completely saturated, measured in seconds, is the Wet Out Time for the sample and represents the absorbent rate of the tissue. Increases in the Wet Out Time represent a decrease in the absorbent rate.

In one embodiment, various additives may be added to the composition in order to adjust the viscosity of the composition. For instance, in one embodiment, a thickener may be applied to the composition in order to increase its viscosity. In general, any suitable thickener may be used in accordance with the present invention. For example, in one embodiment, polyethylene oxide may be combined with the composition to increase the viscosity. For example, polyethylene oxide may be combined with a polysiloxane softener and a beneficial agent to adjust the viscosity of the composition to ensure that the composition will produce fibers when extruded through the meltblown die.

Optional Chemical Additives

Optional chemical additives may also be added to the aqueous papermaking furnish or to the embryonic tissue sheet to impart additional benefits to the product and process and are not antagonistic to the intended benefits of the present invention. The following materials are included as examples of additional chemicals that may be applied to the tissue sheet with the additives of the present invention. The chemicals are included as examples and are not intended to limit the scope of the present invention. They may also be added simultaneously with the additives applied via the fiber deposition apparatus.

Charge Control Agents

Charge promoters and control agents are commonly used in the papermaking process to control the zeta potential of the papermaking furnish in the wet end of the process. These species may be anionic or cationic, most usually cationic, and may be either naturally occurring materials such as alum or low molecular weight high charge density synthetic polymers typically of molecular weight of about 500,000 or less. Drainage and retention aids may also be added to the furnish to improve formation, drainage and fines retention. Included within the retention and drainage aids are microparticle systems containing high surface area, high anionic charge density materials.

Strength Agents

Wet and dry strength agents may also be applied to the tissue sheet. As used herein, "wet strength agents" refer to materials used to immobilize the bonds between fibers in the wet state. Typically, the means by which fibers are held together in paper and tissue products involve hydrogen bonds and sometimes combinations of hydrogen bonds and covalent and/or ionic bonds. In the present invention, it may be useful to provide a material that will allow bonding of fibers in such a way as to immobilize the fiber-to-fiber bond points and make them resistant to disruption in the wet state. In this instance, the wet state usually will mean when the product is largely saturated with water or other aqueous solutions, but could also mean significant saturation with body fluids such as urine, blood, mucus, menses, runny bowel movement, lymph, and other body exudates.

Any material that when added to a tissue sheet or sheet results in providing the tissue sheet with a mean wet geometric tensile strength:dry geometric tensile strength ratio in excess of about 0.1 will, for purposes of the present invention, be termed a wet strength agent. Typically these materials are termed either as permanent wet strength agents or as "temporary" wet strength agents. For the purposes of differentiating permanent wet strength agents from temporary wet strength agents, the permanent wet strength agents will be defined as those resins which, when incorporated into paper or tissue products, will provide a paper or tissue product that retains more than 50% of its original wet strength after exposure to water for a period of at least five minutes. Temporary wet strength agents are those which show about 50% or less than, of their original wet strength after being saturated with water for five minutes. Both classes of wet strength agents find application in the present invention. The amount of wet strength agent added to the pulp fibers may be at least about 0.1 dry weight percent, more specifically about 0.2 dry weight percent or greater, and still more specifically from about 0.1 to about 3 dry weight percent, based on the dry weight of the fibers.

Permanent wet strength agents will typically provide a more or less long-term wet resilience to the structure of a tissue sheet. In contrast, the temporary wet strength agents will typically provide tissue sheet structures that had low density and high resilience, but would not provide a structure that had long-term resistance to exposure to water or body fluids.

Wet and Temporary Wet Strength Agents

The temporary wet strength agents may be cationic, nonionic or anionic. Such compounds include PAREZ™ 631 NC and PAREZ® 725 temporary wet strength resins that are cationic glyoxylated polyacrylamide available from Cytec Industries (West Paterson, N.J.). This and similar resins are described in U.S. Pat. No. 3,556,932, issued on Jan. 19, 1971 to Coscia et al. and U.S. Pat. No. 3,556,933, issued on Jan. 19, 1971 to Williams et al. Hercobond1366, manufactured by Hercules, Inc., located at Wilmington, Del., is another commercially available cationic glyoxylated polyacrylamide that may be used in accordance with the present invention. Additional examples of temporary wet strength agents include dialdehyde starches such as Cobond® 1000 from National Starch and Chemical Company and other aldehyde containing polymers such as those described in U.S. Pat. No. 6,224,714 issued on May 1, 2001 to Schroeder et al.; U.S. Pat. No. 6,274,667 issued on Aug. 14, 2001 to Shannon et al.; U.S. Pat. No. 6,287,418 issued on Sep. 11, 2001 to Schroeder et al.; and, U.S. Pat. No. 6,365,667 issued on Apr. 2, 2002 to Shannon et al., the disclosures of which are herein incorporated by reference to the extend they are non-contradictory herewith.

Permanent wet strength agents comprising cationic oligomeric or polymeric resins can be used in the present invention. Polyamide-polyamine-epichlorohydrin type resins such as KYMENE 557H sold by Hercules, Inc., located at Wilmington, Del., are the most widely used permanent wet-strength agents and are suitable for use in the present invention. Such materials have been described in the following U.S. Pat. Nos.: U.S. Pat. No. 3,700,623 issued on Oct. 24, 1972 to Keim; U.S. Pat. No. 3,772,076 issued on Nov. 13, 1973 to Keim; U.S. Pat. No. 3,855,158 issued on Dec. 17, 1974 to Petrovich et al.; U.S. Pat. No. 3,899,388 issued on Aug. 12, 1975 to Petrovich et al.; U.S. Pat. No. 4,129,528 issued on Dec. 12, 1978 to Petrovich et al.; U.S. Pat. No. 4,147,586 issued on Apr. 3, 1979 to Petrovich et al.; and, U.S. Pat. No. 4,222,921 issued on Sep. 16, 1980 to van Eenam. Other cationic resins include polyethylenimine resins and aminoplast resins obtained by reaction of formaldehyde with melamine or urea. It is often advantageous to use both permanent and temporary wet strength resins in the manufacture of tissue products with such use being recognized as falling within the scope of the present invention.

Dry Strength Agents

Dry strength agents may also be applied to the tissue sheet without affecting the performance of the present invention. Such materials used as dry strength agents are well known in the art and include but are not limited to modified starches and other polysaccharides such as cationic, amphoteric, and anionic starches and guar and locust bean gums, modified polyacrylamides, carboxymethylcellulose, sugars, polyvinyl alcohol, chitosan, and the like. Such dry strength agents are typically added to a fiber slurry prior to tissue sheet formation or as part of the creping package.

Additional Softening Agents

At times it may be advantageous to add additional debonders or softening chemistries to a tissue sheet. Examples of such debonders and softening chemistries are broadly taught in the art. Exemplary compounds include the simple quaternary ammonium salts having the general formula $(R^{1'})_{4-b}\ N^{+}\ (R^{1''})_{b}\ X^{-}$ wherein $R^{1'}$ is a $C_{1-6}$ alkyl group, $R^{1''}$ is a $C_{14}$-$C_{22}$ alkyl group, b is an integer from 1 to 3 and X− is any suitable counterion. Other similar compounds include the monoester, diester, monoamide and diamide derivatives of the simple quaternary ammonium salts. A number of variations on these quaternary ammonium compounds are known and should be considered to fall within the scope of the present invention. Additional softening compositions include cationic oleyl imidazoline materials such as methyl-1-oleyl amidoethyl-2-oleyl imidazolinium methylsulfate commercially available as Mackernium DC-183 from McIntyre Ltd., located in University Park, Ill. and Prosoft TQ-1003 available from Hercules, Inc.

Miscellaneous Agents

In general, the present invention may be used in conjunction with any known materials and chemicals that are not antagonistic to its intended use. Examples of such materials and chemicals include, but are not limited to, odor control agents, such as odor absorbents, activated carbon fibers and particles, baby powder, baking soda, chelating agents, zeolites, perfumes or other odor-masking agents, cyclodextrin compounds, oxidizers, and the like. Superabsorbent particles, synthetic fibers, or films may also be employed. Additional options include cationic dies, optical brighteners, absorbency aids and the like. A wide variety of other materials and chemicals known in the art of papermaking and tissue production may be included in the tissue sheets of the present invention including lotions and other materials providing skin health benefits including but not limited to such things as aloe extract and tocopherols such as Vitamin E and the like.

The application point for such materials and chemicals is not particularly relevant to the present invention and such materials and chemicals may be applied at any point in the tissue manufacturing process. This includes pre-treatment of pulp, co-application in the wet end of the process, post treatment after drying but on the tissue machine and topical post treatment.

Analytical Methods

The following analytical methods are provided to provide a better understanding of some of the terms used to describe the present invention.

Determination of Atomic % Silicon

X-ray photoelectron spectroscopy (XPS) is a method used to analyze certain elements lying on the surface of a material. Sampling depth is inherent to XPS. Although the x-rays can penetrate the sample microns, only those electrons that originate at the outer ten Angstroms below the solid surface can leave the sample without energy loss. It is these electrons that produce the peaks in XPS. The electrons that interact with the surrounding atoms as they escape the surface form the background signal. The sampling depth is defined as 3 times the inelastic mean free path (the depth at which 95% of the photoemission takes place), and is estimated to be 50-100 angstroms. The mean free path is a function of the energy of the electrons and the material that they travel through.

The flux of photoelectrons that come off the sample, collected, and detected is elemental and instrumental dependent. It is not overly critical to the results as herein expressed. The atomic sensitivity factors are various constants for each element that account for these variables. The atomic sensitivity factors are supplied with the software from each XPS instrument manufacturer. Those skilled in the art will understand the need to use the set of atomic sensitivity factors designed for their instrument. The atomic sensitivity factor (S) is defined by the equation:

$S=f\sigma\theta y\lambda AT$ and is a constant for each photoelectron.

f=x-ray flux

σ=photoelectron cross-section

θ—angular efficiency factor y=efficiency in the photoelectron process

λ=mean free path

A=area of sample

T=detection efficiency

Atomic concentrations are determined by the following equation:

$$C_x=I_x/S_x/(I_i/S_i)$$

Cx=atomic fraction of element x

Ix=peak intensity of photoelectron of element x

Sx=atomic sensitivity factor for photoelectron of element x

The relative surface concentration and z-directional gradient of chemical additives on tissue samples may be determined by x-ray photoelectron spectroscopy (XPS) using a Fisions M-Probe spectrometer equipped with monochromatic Al Kα x-rays, as reported in Surface Interface Analysis, vol 10, pages 36-47 (1987).

Sample Preparation

Several tissue sheets treated with a chemical additive are placed in a successive fashion to form a stack. The stack of tissue sheets are wrapped in aluminum foil for storage prior to being analyzed. Samples are prepared from a single sheet of material obtained from the center of the stack. A center sheet is chosen to prevent the possibility of smearing of the treatment or cross-contamination with the packaging. A ca. 1 cm×1 cm representative section is cut from the center of a selected sheet. The 1 cm×1 cm section is divided in half. The outer fibers are analyzed from one half and the opposite side is analyzed from the second half. Each section of tissue is mounted to a sample holder using a silicone free double sided tape such as Scotch™ Brand Double Stick Tape. The mounted samples are placed in the introduction chamber and allowed to pump down to at least $1\times10^{-4}$ torr prior to moving them into the analyzing chamber. Prior to analysis, the base pressure in the analysis chamber is allowed to reach $1.0\times10^{-7}$ torr or less.

Spectral Acquisition

Due to the insulating capacity of the cellulosic media, a metal screen is placed over the samples and charge compensation is accomplished using an electron flood gun. The flood gun is adjusted to optimize peak height and minimize the resolution of the C1s peak. The same charging compensation is used for all the samples. The binding energy scale of each spectra is adjusted by referencing the C—C/C—H contribution of the C1s peak to 285.0 eV. Survey spectra from 0-600 eV are acquired from each sample. Three regions are analyzed per sample and the results averaged.

Data Processing

Data processing of the collected spectra is accomplished using M-Probe ESCA Software, release S-Probe 1.26.00, revision date Sep. 2, 1994. Atomic percentage calculations are obtained from peak area measurements and atomic sensitivity factors supplied with the software. The data is either presented as Si/C ratios or as surface coverage measurements. The surface coverage calculations are made based on measurements made from a thin film of the silicone surface treatment cast on a gold coated glass slide.

Percent Surface Coverage=A/B*100

A=Si/C ratio from treated sample

B=Si/C ratio from prepared Surface treatment on gold coated glass slide

Polydialkylsiloxane Content

The polydimethylsiloxane content on cellulose fiber substrates is determined using the following procedure. A sample containing polydimethylsiloxane is placed in a headspace vial, boron trifluoride reagent is added, and the vial sealed. After reacting for about fifteen minutes at about 100° C., the resulting Diflourodimethyl siloxane in the headspace of the vial is measured by gas chromatography with an FID detector.

$$3Me_2SiO+2BF_3.O(C_2H_5)_2\rightarrow 3Me_2SiF_2+B_2O_3+2(C_2H_5)_2O$$

The method described herein was developed using a Hewlett-Packard Model 5890 Gas Chromatograph with an FID and a Hewlett-Packard 7964 autosampler. An equivalent gas chromatography system may be substituted.

The instrument is controlled by, and the data collected using, Perkin-Elmer Nelson Turbochrom software (version 4.1). An equivalent software program may be substituted. A J&W Scientific GSQ (30 m×0.53 mm i.d.) column with film thickness 0.25 μm, Cat. #115-3432 was used. An equivalent column may be substituted.

The gas chromatograph is equipped with a Hewlett-Packard headspace autosampler, HP-7964 and set up at the following conditions:

| | |
|---|---|
| Bath Temperature: | 100° C. |
| Transfer Line Temperature: | 120° C. |
| Vial Equilibrium Time: | 15 minutes |
| Loop Fill Time: | 0.2 minutes |
| Inject Time: | 1.0 minute |
| Loop Temperature: | 110° C. |
| GC Cycle Time: | 25 minutes |
| Pressurize Time: | 0.2 minutes |
| Loop Equil. Time: | 0.05 minutes |
| Vial Shake: | 1 (Low) |

The gas chromatograph is set to the following instrument conditions:

Carrier gas: Helium

Flow rate: 16.0 mL through column and 14 mL make-up at the detector.

Injector Temperature: 150° C.

Detector Temperature: 220° C.

Chromatography Conditions:

50° C. for 4 minutes with a ramp of 10° C./minute to 150° C.

Hold at final temperature for 5 minutes.

Retention Time: 7.0 min. for DFDMS

Preparation of Stock Solution

The method is calibrated to pure PDMS using DC-200 fluid available from Dow Corning, Midland, Mich. A stock solution containing about 1250 μg/ml of the DC-200 fluid is prepared in the following manner. About 0.3125 grams of the DC-200 fluid is weighed to the nearest 0.1 mg into a 250-ml volumetric flask. The actual weight (represented as X) is recorded. A suitable solvent such as methanol, MIBK or chloroform is added and the flask swirled to dissolve/disperse the fluid. When dissolved the solution is diluted to volume with solvent and mixed. The ppm of dimethylpolysiloxane (represented as Y) is calculated from the following equation:

$$\text{PPM of dimethylpolysiloxane } (Y)=X/0.250$$

Preparation of Calibration Standards

The Calibration Standards are made to bracket the target concentration by adding 0 (blank), 50, 100, 250, and 500 μL of the Stock Solution (the volume in uL $V_c$ recorded) to successive 20 mL headspace vials containing 0.1±0.001 grams of an untreated control tissue web or tissue product. The solvent is evaporated by placing the headspace vials in an oven at a temperature ranging between about 60° C. to about 70° C. for about 15 minutes. The μg of dimethylpolysiloxane (represented as Z) for each calibration standard is calculated from the following equation:

$$Z=Vc*Y/1000$$

Analytical Procedure

The calibration standards are then analyzed according to the following procedure:

0.100±0.001 g of tissue sample is weighed to the nearest 0.1 mg into a 20-ml headspace vial. The sample weight (represented as $W_s$) in mg is recorded. The amount of tissue web and/or tissue product taken for the standards and samples must be the same.

100 μL of $BF_3$ reagent is added to each of the samples and calibration standards. Each vial is sealed immediately after adding the $BF_3$ reagent.

The sealed vials are placed in the headspace autosampler and analyzed using the conditions described previously, injecting 1 mL of the headspace gas from each tissue sample and standard.

Calculations

A calibration curve of μg dimethylpolysiloxane versus analyte peak area is prepared.

The analyte peak area of the tissue sample is then compared to the calibration curve and amount of polydimethylsiloxane (represented as (A)) in μg on the tissue web and/or tissue product is determined.

The amount of polydimethylsiloxane (represented as (C)) in percent by weight on the tissue sample is computed using the following equation:

$$(C)=(A)/(W_s*10^4)$$

The amount of the polydimethylsiloxane (represented as (D)) in percent by weight on the tissue sample is computed using the following equation:

$$(D)=(C)/100$$

When polydialkylsiloxanes other than dimethylpolysiloxane are present, calibration standards are made from representative samples of the pure polydialkylsiloxanes that are present and the amount of each polydialkylsiloxane is determined as in the method above for polydimethylsiloxane. The sum of the individual polydialkylsiloxane amounts is then used for the total amount of polydialkylsiloxane present in the tissue web and/or tissue product.

Measurement of Non-ionic Surfactants

Non-ionic surfactant concentration in a tissue can be determined using appropriate test kits and measuring the absorbency at a wavelength of 620 nm. Non-ionic surfactant levels may be measured, for instance, using Dr. Lange non-ionic test solutions available from Dr. Bruno Lange, GmbH, Dusseldorf, Germany. A Hach DR/2000 spectrometer or equivalent is used to measure the absorbance of the specimen. Water samples are prepared by repulping 30 grams of the tissue or fiber in 2 L of deionized water. Smaller sample sizes may be used, for example 3.0 grams of tissue can be slurried in 200 cc of deionized water. The fiber is filtered off using a Britt Jar filter and the filtrate is used as the water sample. The procedure is as follows:

1) After taking the water sample, use either gravity or centrifuge to minimize any fibers in the water phase.
2) Take the Dr. Lange Nonionic test tube, label the cap, and place it in a suitable holder.
3) Using a 2 mL volumetric pipette, add 2 mL of water sample to the Dr. Lange test tube.
4) Put the cap back on and shake the tube vigorously for approximately 5 minutes. For example, for this testing the test tubes were placed in a padded jar and mixed using a Lab Line Orbit Shaker at 200 rpm for 5 minutes.
5) After shaking, the test tube(s) are allowed to settle and for the solvents to separate.
6) After separation, it may be necessary to "roll" the test tubes to eliminate any bubbles that may have formed in the lower phase.
7) Using the Hach DR/2000 spectrometer (or other similar spectrometer) set to test method 0 and turn the wavelength dial to 620 nm.
8) Prepare a blank sample according to steps 2 through 6 using a deionized water trial when a blank is needed.
9) Insert the blank test tube into the sample holder and blank the instrument by hitting the zero button.
10) Insert the sample to be tested, making sure that no bubbles are in the way of the spectrophotometer's beam.
11) Press the read button and record the absorbance. Repeat for each sample.

The ratio of silicone to non-ionic surfactant is measured by taking the absorbance of the sample and dividing by the amount of silicone as determined by the BF3/GC method using a PDMS standard.

EXAMPLE NO. 1

In order to further illustrate the present invention, a conventional polysiloxane formulation was applied to a throughdried tissue web using a rotogravure coater. For purposes of comparison, several different polysiloxane compositions were applied to the same bath tissue according to the present invention. In particular, neat polysiloxane compositions were fiberized using a uniform fiber depositor marketed by ITW Dynatec and applied in a discontinuous fashion to the tissue web.

More specifically, a single-ply, three-layered uncreped throughdried bath tissue was made using eucalyptus fibers for the outer layers and softwood fibers for the inner layer. Prior to pulping, a quaternary ammonium softening agent (C-6027 from Goldschmidt Corp.) was added at a dosage of 4.1 kg/metric ton of active chemical per metric ton of fiber to the eucalyptus furnish. After allowing 20 minutes of mixing time, the slurry was dewatered using a belt press to approximately 32% consistency. The filtrate from the dewatering process was either sewered or used as pulper make-up water for subsequent fiber batches but not sent forward in the stock preparation or tissue making process. The thickened pulp containing the debonder was subsequently re-dispersed in water and used as the outer layer furnishes in the tissue making process.

The softwood fibers were pulped for 30 minutes at 4 percent consistency and diluted to 3.2 percent consistency after pulping, while the debonded eucalyptus fibers were diluted to 2 percent consistency. The overall layered sheet weight was split 30%/40%/30% among the eucalyptus/refined softwood/eucalyptus layers. The center layer was refined to levels required to achieve target strength values, while the outer layers provided the surface softness and bulk. Parez 631NC was added to the center layer at 2-4 kilograms per ton of pulp based on the center layer.

A three layer headbox was used to form the web with the refined northern softwood kraft stock in the two center layers of the headbox to produce a single center layer for the three-layered product described. Turbulence-generating inserts recessed about 3 inches (75 millimeters) from the slice and layer dividers extending about 1 inch (25.4 millimeters) beyond the slice were employed. The net slice opening was about 0.9 inch (23 millimeters) and water flows in all four headbox layers were comparable. The consistency of the stock fed to the headbox was about 0.09 weight percent.

The resulting three-layered sheet was formed on a twin-wire, suction form roll, former with forming fabrics being Lindsay 2164 and Asten 867a fabrics, respectively. The speed of the forming fabrics was 11.9 meters per second. The newly-formed web was then dewatered to a consistency of about 20-27 percent using vacuum suction from below the forming fabric before being transferred to the transfer fabric, which was traveling at 9.1 meters per second (30% rush transfer). The transfer fabric was an Appleton Wire T807-1. A vacuum shoe pulling about 6-15 inches (150-380 millimeters) of mercury vacuum was used to transfer the web to the transfer fabric.

The web was then transferred to a throughdrying fabric (Lindsay wire T1205-1). The throughdrying fabric was traveling at a speed of about 9.1 meters per second. The web was carried over a Honeycomb throughdryer operating at a temperature of about 350° F., (175° C.) and dried to final dryness of about 94-98 percent consistency. The resulting uncreped tissue sheet was then wound into a parent roll.

The parent roll was then unwound and the web was calendered twice. At the first station the web was calendered between a steel roll and a rubber covered roll having a 4 P&J hardness. The calender loading was about 90 pounds per linear inch (pli). At the second calendering station, the web was calendered between a steel roll and a rubber covered roll having a 40 P&J hardness. The calender loading was about 140 pli. The thickness of the rubber covers was about 0.725 inch (1.84 centimeters).

A portion of the web was then fed into the rubber-rubber nip of a rotogravure coater to apply the a polydimethylsiloxane emulsion to both sides of the web. The aqueous emulsion contained 25% polydimethylsiloxane (Wetsoft CTW of Kelmar Industries); 8.3% surfactant; 0.75% antifoamer and 0.5% preservative.

The gravure rolls were electronically engraved, chrome over copper rolls supplied by Specialty Systems, Inc., Louisville, Ky. The rolls had a line screen of 200 cells per lineal inch and a volume of 6.0 Billion Cubic Microns (BCM) per square inch of roll surface. Typical cell dimensions for this roll were 140 microns in width and 33 microns in depth using a 130 degree engraving stylus. The rubber backing offset applicator rolls were a 75 shore A durometer cast polyurethane supplied by Amerimay Roller company, Union Grove, Wis. The process was set up to a condition having 0.375 inch interference between the gravure rolls and the rubber backing rolls and 0.003 inch clearance between the facing rubber backing rolls. The simultaneous offset/offset gravure printer was run at a speed of 2000 feet per minute using gravure roll speed adjustment (differential) to meter the polysiloxane emulsion to obtain the desired addition rate. The gravure roll speed differential used for this example was 1000 feet per minute. The process yielded an add-on level of 2.5 weight percent total add-on based on the weight of the tissue (1.25% each side).

Another portion or section of the formed tissue web was then fed through a uniform fiber depositor (UFD—a type of meltblown die) as described above. The uniform fiber depositor had 17 nozzles per inch and operated at an air pressure of 20 psi. The die applied a fiberized neat polysiloxane composition onto the web. The polysiloxanes used in this example included Wetsoft CTW, a polydimethylsiloxane of Kelmar Industries AF-23, a reactive aminoethylaminopropyl polysiloxane of Kelmar Industries EXP-2076, an alkoxy functional poly(dialkyl)siloxane of Kelmar Industries SWS-5000, a linear non-reactive poly(dialkyl)siloxane of Kelmar Industries.

The polysiloxanes were added to the web to yield an add-on level as shown in Table 1, below.

After the webs were formed, each web was tested for Wet Out Time and for geometric mean tensile strength (GMT) as described above. In addition, the webs were tested for softness and stiffness values which were obtained through a Sensory Profile Panel testing method. A group of 12 trained panelists were given a series of tissue prototypes, one sample at a time. For each sample, the panelists rate the tissue for softness and stiffness on a letter grade scale, with A being the highest ranking. Results are reported as an average of panel rankings. The following results were obtained:

| Sample No. | Polysiloxane | Process | % Si | Wet Out Time | GMT | Stiffness | Softness |
|---|---|---|---|---|---|---|---|
| Control | Wetsoft CTW | Rotogravure | 1.9 | 7.8 | 598 | B | B |
| 1 | AF-23 | UFD | 1.5 | 5.3 | 699 | A+ | A |
| 2 | Wetsoft CTW | UFD | 2.5 | 5.5 | 743 | A | A |
| 3 | Wetsoft CTW | UFD | 2 | 6.2 | 757 | A | A |
| 4 | Wetsoft CTW | UFD | 1.5 | 5.9 | 802 | A | B |
| 5 | EXP-2076 | UFO | 2.5 | 7.2 | 659 | A | B |
| 6 | EXP-2076 | UFD | 2 | 9.2 | 698 | A | B+ |
| 7 | EXP-2076 | UFD | 1.5 | 5.8 | 728 | A | A |
| 8 | SWS-5000 | UFD | 2.5 | 5.2 | 662 | A | B |
| 9 | SWS-5000 | UFD | 2 | 5.8 | 741 | B | B |
| 10 | SWS-5000 | UFD | 1.5 | 4.3 | 727 | A | A |
| 11 | SWS-5000 | UFD | 1 | 3.8 | 774 | A | B |

The control, Sample Nos. 1 and 3, and several commercial samples were analyzed for polydialkylsiloxane content and non-ionic surfactant levels via the methods described previously. The following results were obtained:

| Sample No. | Silicone in tissue (%) as polydialkylsiloxane | Absorbency at 620 nm. | Ratio of Absorbency: Silicone | Wet out time (sec) |
|---|---|---|---|---|
| Commercial Sample #1 (2-ply) | 0.1% | 0.166 | 1.7 | 5.3 |
| Commercial Sample #2 (2-ply) | 0.5% | 0.54 | 1.1 | 38.3 |
| Commercial Sample #3 (3-ply) | 1.0% | 0.808 | 0.8 | 59.3 |
| Control | 0.35% | 2.34 | 6.7 | 7.8 |
| 1 | 1.3% | 0.357 | 0.27 | 5.3 |
| 3 | 0.35% | 2.14 | 6.1 | 6.2 |

In the above table, Commercial Sample No. 1 was a sample of PUFFS facial tissue sold by the Procter and Gamble Company, Commercial Sample No. 2 was a sample of PUFFS EXTRA STRENGTH facial tissue also sold by the Procter and Gamble Company, and Commercial Sample No. 3 was a sample of KLEENEX ULTRA facial tissue sold by the Kimberly-Clark Corporation.

The control and Sample No. 3 containing an aminofunctional polyethersiloxane indicates that the polyether functional polysiloxanes interfere with the test results. However, note that for Sample No. 1 that the absorbency to polydialkylsiloxane ratio is far less than commercially available tissues, yet the wet out time remains extremely low.

As shown above, the tissue samples treated with the uniform fiber deposition method generally had a shorter wet out time with a stronger geometric mean tensile strength and excellent stiffness and softness characteristics.

EXAMPLE NO. 2

The following is a prophetic example:

Using XPS, the atomic % silicone is measured at five places on the exterior surface of the single ply treated tissue of Sample No. 2 and the average found to be about 20 atom % on the exterior surface. A tape split is made of the material and the atom % silicone on the interior surface measured at five places using XPS. The atom % silicone is found to be 15% for a delta % between the center and exterior surface of 25%.

In a similar manner the atomic % silicone is measured at five places on the exterior surface of the treated tissue of the control. The average atom % silicone is found to be about 18%. A tape split is made and the % silicone on the interior surface measured at five places using XPS spectroscopy. The average atom % silicone is determined to be 17% for a delta % between the center and the exterior surface of 5%.

A multi-ply commercially available polysiloxane treated facial tissue that has been treated on only one side of the exterior plies is taken and the atom % silicone on the outside treated surface is determined to be 20.9 atom %. The interior non-treated side of the treated ply is then measured and determined to have a surface silicone concentration of 18.8 atom %. Assuming an even gradient of polysiloxane in the z-direction the delta % between the center and exterior surface of the treated ply is 5.6%. This particular sample is prepared using a gravure printing process.

Another commercially available multi-ply silicone treated facial tissue that has been treated on only one side of the exterior plies is taken and the atom % silicone on the outside treated surface determined to be 10.3 Atom %. The interior non-treated side of the treated ply is then measured and determined to have a surface silicone concentration of 8.7 atom %. Assuming an even gradient of polysiloxane in the z-direction the delta % between the center and exterior surface of the treated ply is 7.3%. This particular sample is believed to have been prepared using a process similar to that of the previous commercially available tissue.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A single ply tissue sheet comprising:

a tissue web containing cellulosic fibers, the tissue web including a first side, a center, and a second and opposite side; and a softening agent present at the first side and at the second side of the tissue web, wherein the softening agent is distributed non-uniformly across the thickness of the tissue web so as to form a gradient in the Z-direction of the web, the Z-directional gradient between the first and second sides of the web and the center of the web being at least 15%.

2. A single ply tissue sheet as defined in claim 1, wherein the Z-directional gradient is at least 20%.

3. A single ply tissue sheet as defined in claim 1, wherein the Z-directional gradient is at least 40%.

4. A single ply tissue sheet as defined in claim 1, wherein the Z-directional gradient is at least 70%.

5. A single ply tissue sheet as defined in claim 1, wherein the tissue web comprises softwood fibers, hardwood fibers, or mixtures thereof.

6. A single ply tissue sheet as defined in claim 1, wherein the softening agent comprises a polysiloxane.

7. A single ply tissue sheet as defined in claim 6, wherein the polysiloxane contains a polydialkylsiloxane component comprising from about 0.05% to about 5% by weight of the total sheet weight.

8. A single ply tissue sheet as defined in claim 1, wherein the softening agent is combined with a skin beneficial agent, the skin beneficial agent comprising aloe vera, vitamin E, petrolatum, or mixtures thereof.

9. A single ply tissue sheet as defined in claim 1, wherein the softening agent has been topically applied to each side of the tissue web.

10. A single ply tissue sheet as defined in claim 1, wherein the tissue web contains surfactants in an amount of less than about 0.08% by weight of dry fiber.

11. A single ply tissue sheet as defined in claim 1, wherein the tissue web contains surfactants in an amount of less than about 0.025% by weight of dry fiber.

12. A single ply tissue sheet as defined in claim 7, wherein the tissue web contains surfactants in an amount of less than about 5% by weight of the amount of polydialkylsiloxane present in the sheet.

13. A single ply tissue sheet as defined in claim 7, wherein the tissue web contains non-ionic surfactants in an amount of less than about 5% by weight of the amount of polydialkylsiloxane present in the sheet.

14. A single ply tissue sheet as defined in claim 7, wherein the tissue web contains non-ionic surfactants having an absorbency at 620 nm of less than 0.15%.

15. A single ply tissue sheet as defined in claim 7, wherein the ratio of an absorbency to polydialkylsiloxane content ratio of less than about 0.65.

16. A single ply tissue sheet as defined in claim 1, wherein the softening agent is present on the first side and the second side of the tissue web in the form of continuous filaments distributed in a random fashion across the surface of the tissue.

17. A single ply tissue sheet as defined in claim 1, wherein the tissue web has a basis weight of from about 5 gsm to about 200 gsm.

18. A single ply tissue sheet as defined in claim 1, wherein the softening agent covers from about 0.5% to about 80% of the surface area of each side of the tissue web.

19. A single ply tissue sheet as defined in claim 12, wherein the tissue sheet has a Wet Out Time of less than about 10 seconds.

20. A single ply tissue sheet as defined in claim 13, wherein the tissue sheet has a Wet Out Time of less than about 10 seconds.

21. A single ply tissue sheet as defined in claim 1, wherein the softening agent is present on each side of the tissue web in the form of a random continuous network.

22. A single ply tissue sheet as defined in claim 1, wherein the tissue web has a bulk of greater than about 2 $cm^3/g$.

23. A single ply tissue sheet as defined in claim 1, wherein the tissue web has a bulk of greater than about 8 $cm^3/g$.

24. A single ply tissue sheet as defined in claim 1, wherein the softening agent comprises an amino-functional polydialkylsiloxane, a polydialkylsiloxane, a polyetherpolydialkylsiloxane , an amino functional polyetherpolydialkylsiloxane copolymer and mixtures thereof.

25. A single or multi-ply dry tissue sheet comprising:

a tissue web containing cellulosic fibers, the tissue web having a first side, and a second and opposite side;

a softening agent present at the first side and optionally the second side of the tissue web, the softening agent comprising a polydialkylsiloxane component present in the web in an amount of from about 0.1% to about 5% by weight; and wherein the dry tissue sheet contains non-ionic surfactants in an amount of less than about 5% by weight of the amount of polydialkylsiloxane present in the sheet.

26. A tissue sheet as defined in claim 25, wherein the tissue web contains non-ionic surfactants having an absorbency at 620 nm of less than 0.15%.

27. A tissue sheet as defined in claim 25, wherein the ratio of absorbency to polydialkylsiloxane content is less than about 0.65.

28. A tissue sheet as defined in claim 25, wherein the ratio of absorbency to polydialkylsiloxane content is less than about 0.4.

29. A tissue sheet as defined in claim 25, wherein the tissue web contains total surfactants in an amount of less than about 5% by weight of the amount of polydialkylsiloxane present in the sheet.

30. A tissue sheet as defined in claim 25 comprising a single ply, wherein the softening agent is applied to both sides of the single ply tissue web and wherein the softening agent is distributed non-uniformly across the thickness of the tissue web so as to form a gradient in the Z-direction of the web, the Z-directional gradient between the first and second sides of the web and the center of the web being at least 15%.

31. A single ply tissue sheet as defined in claim 30, wherein the softening agent is distributed non-uniformly across the thickness of the tissue web so as to form a gradient in the Z-direction of the web, the Z-directional gradient between the first and second sides of the web and the center of the web being at least 25%.

32. A single ply tissue sheet as defined in claim 30, wherein the softening agent is distributed non-uniformly across the thickness of the tissue web so as to form a gradient in the Z-direction of the web, the Z-directional gradient between the first and second sides of the web and the center of the web being at least 50%.

33. A single ply tissue sheet as defined in claim 30, wherein the softening agent is distributed non-uniformly across the thickness of the tissue web so as to form a gradient in the Z-direction of the web, the Z-directional gradient between the first and second sides of the web and the center of the web being at least 70%.

34. A tissue sheet as defined in claim 25, wherein the tissue web comprises softwood fibers, hardwood fibers, or mixtures thereof.

35. A tissue sheet as defined in claim 25, wherein the softening agent is combined with a skin beneficial agent, the skin beneficial agent comprising aloe vera, vitamin E, petrolatum, or mixtures thereof.

36. A tissue sheet as defined in claim 25, wherein the softening agent has been topically applied to each side of the tissue web.

37. A tissue sheet as defined in claim 25, wherein the softening agent is deposited on the first side and the second side of the tissue web in the form of continuous filaments.

38. A tissue sheet as defined in claim 25, wherein the tissue web has a basis weight of from about 5 gsm to about 80 gsm.

39. A tissue sheet as defined in claim 25, wherein the softening agent covers from about 40% to about 80% of the surface area of each side of the tissue web.

40. A tissue sheet as defined in claim 25, wherein the tissue web has a Wet Out Time of less than about 20 seconds.

41. A tissue sheet as defined in claim 40, wherein the tissue web has a Wet Out Time of less than about 8 seconds.

42. A tissue sheet as defined in claim 25, wherein the softening agent is present on each side of the tissue web in the form of a random continuous network.

43. A tissue sheet as defined in claim 25, wherein the tissue web has a bulk of greater than about 2 $cm^3/g$.

44. A tissue sheet as defined in claim 25, wherein the tissue web has a bulk of greater than about 8 $cm^3/g$.

45. A tissue sheet as defined in claim 25, wherein the softening agent comprises an amino functional polysiloxane, a polydialkylsiloxane, a polyetherpolydialkylsiloxane , an amino functional polyetherpolydialkylsiloxane copolymer and mixtures thereof.

46. A single ply tissue sheet comprising:

a tissue web containing cellulosic fibers, the tissue web including a first side, a center, and a second and opposite side; and a softening agent present at the first side and at the second side of the tissue web, wherein the softening agent is distributed non-uniformly across the thickness of the tissue web so as to form a gradient in the Z-direction of the web, the softening agent being present at the first side and at the second side of the web in a random continuous network defining treated areas and untreated areas, the random continuous network comprising continuous filaments.

* * * * *

UNITED STATES PATENT AND TRADEMARK OFFICE
CERTIFICATE OF CORRECTION

PATENT NO. : 7,396,593 B2
APPLICATION NO. : 10/441143
DATED : July 8, 2008
INVENTOR(S) : Liu et al.

It is certified that error appears in the above-identified patent and that said Letters Patent is hereby corrected as shown below:

On the Title Pg Item (56)
On page 3, of the References Cited Section, U.S. Patent Documents, the following need to added:

| | | |
|---|---|---|
| 6,428,794 | 8/2002 | Klofta et al. |
| 6,458,343 | 10/2002 | Zeman et al. |
| 2004/0084162 | 5/2004 | Shannon et al. |
| 2004/0084165 | 5/2004 | Shannon et al. |
| 2004/0086726 | 5/2004 | Moline et al. |

On page 3, Item (56) of the References Cited Section, Foreign Patent Documents, the following need to be added:

| | |
|---|---|
| WO 9608601 A1 | 3/1996 |
| WO 2004035924 A1 | 4/2004 |

On page 3, Item (56) of the References Cited Section, Other Publications, the following need to be added:

PCT Search Report and Written Opinion for PCT/US2005/029474

Signed and Sealed this

Eighth Day of December, 2009

David J. Kappos
*Director of the United States Patent and Trademark Office*